(12) United States Patent
Komatsu et al.

(10) Patent No.: US 10,310,270 B2
(45) Date of Patent: Jun. 4, 2019

(54) VIRTUAL IMAGE DISPLAY APPARATUS

(71) Applicant: SEIKO EPSON CORPORATION, Tokyo (JP)

(72) Inventors: Akira Komatsu, Tatsuno-machi (JP); Takahiro Totani, Suwa (JP); Masayuki Takagi, Matsumoto (JP); Takashi Takeda, Suwa (JP); Toshiaki Miyao, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/797,261

(22) Filed: Oct. 30, 2017

(65) Prior Publication Data

US 2018/0067320 A1 Mar. 8, 2018

Related U.S. Application Data

(62) Division of application No. 14/910,139, filed as application No. PCT/JP2014/004379 on Aug. 26, 2014, now Pat. No. 9,829,709.

(30) Foreign Application Priority Data

Sep. 3, 2013 (JP) .................................. 2013-182162
Dec. 20, 2013 (JP) .................................. 2013-263480

(51) Int. Cl.
*G02B 13/16* (2006.01)
*G02B 13/18* (2006.01)
(Continued)

(52) U.S. Cl.
CPC ......... *G02B 27/0172* (2013.01); *G02B 13/16* (2013.01); *G02B 13/18* (2013.01); *G02B 17/086* (2013.01); *G02B 17/0848* (2013.01); *G02B 27/0012* (2013.01); *G02B 2027/011* (2013.01); *G02B 2027/013* (2013.01); *G02B 2027/0123* (2013.01); *G02B 2027/0145* (2013.01); *G02B 2027/0178* (2013.01)

(58) Field of Classification Search
CPC .............. G02B 17/0848; G02B 17/086; G02B 2027/0123; G02B 2027/0145;
(Continued)

(56) References Cited

U.S. PATENT DOCUMENTS

| 5,453,877 A | 9/1995 | Gerbe et al. |
| 2003/0086135 A1 | 5/2003 | Takeyama |

(Continued)

FOREIGN PATENT DOCUMENTS

| EP | 1 804 103 A1 | 7/2007 | |
| EP | 1804103 A1 * | 7/2007 | ......... G02B 17/0856 |

(Continued)

OTHER PUBLICATIONS

Dec. 18, 2014 Search Report issued in International Patent Application No. PCT/JP2014/004379.

*Primary Examiner* — Charles V Hicks
(74) *Attorney, Agent, or Firm* — Oliff PLC

(57) ABSTRACT

A light guide member includes three surfaces of a second surface, a fourth surface, and a fifth surface as two or more non-axisymmetric curved surfaces, and a projection lens includes a lens surface as a non-axisymmetric aspheric surface. With this, on the light guide member side, even when there is a shape constraint that the first surface or the third surface which is a surface contributing to light guide is a flat surface, and correction of asymmetric aberration is limited, it becomes possible to perform sufficient aberration correction as the whole of an optical system including the projection lens. Therefore, the virtual image display apparatus can have a wide viewing angle and high performance, and can be made small and lightweight.

11 Claims, 25 Drawing Sheets

(51) Int. Cl.
*G02B 17/08* (2006.01)
*G02B 27/00* (2006.01)
*G02B 27/01* (2006.01)

(58) Field of Classification Search
CPC ...... G02B 2027/0178; G02B 2027/013; G02B 27/0172; G02B 13/16; G02B 13/18; G02B 27/0012; G02B 2027/011
See application file for complete search history.

(56) References Cited

U.S. PATENT DOCUMENTS

| | | |
|---|---|---|
| 2007/0064310 A1 | 3/2007 | Mukawa et al. |
| 2007/0206289 A1 | 9/2007 | Inoguchi et al. |
| 2012/0243102 A1 | 9/2012 | Takeda et al. |

FOREIGN PATENT DOCUMENTS

| | | | |
|---|---|---|---|
| EP | 2 631 695 A1 | 8/2013 | |
| EP | 2631695 A1 * | 8/2013 | ......... G02B 17/0848 |
| JP | H02-297516 A | 12/1990 | |
| JP | 2746697 B2 | 5/1998 | |
| JP | H10-153748 A | 6/1998 | |
| JP | 2002-311379 A | 10/2002 | |
| JP | 2005-250408 A | 9/2005 | |
| JP | 3787399 B2 | 6/2006 | |
| JP | 2007-079031 A | 3/2007 | |
| JP | 2007079031 A * | 3/2007 | |
| JP | 2007-233050 A | 9/2007 | |
| JP | 4218553 B2 | 2/2009 | |
| JP | 4819532 B2 | 11/2011 | |
| WO | 2012088478 A1 | 6/2012 | |

* cited by examiner (A)

(D)

(B)

(E)

(C)

(F)

(A)

(D)

(B)

(E)

(C)

(F)

(A)

(D)

(B)

(E)

(C)

(F)

(A)

(D)

(B)

(E)

(C)

(F)

(A)

(D)

(B)

(E)

(C)

(F)

(A)

(D)

(B)

(E)

(C)

(F)

VIRTUAL IMAGE DISPLAY APPARATUS

CROSS-REFERENCE TO RELATED APPLICATIONS

This is a Division of application Ser. No. 14/910,139 filed Feb. 4, 2016, which in turn is a National Stage of International Patent Application No. PCT/JP2014/004379 filed Aug. 26, 2014, which claims the benefit of Japanese Patent Application No. 2013-182162 filed Sep. 3, 2013 and Japanese Patent Application No. 2013-263480 filed Dec. 20, 2013. The disclosure of the prior applications is hereby incorporated by reference herein in its entirety.

TECHNICAL FIELD

The present invention relates to a virtual image display apparatus which provides video formed by an image display element or the like to an observer, and in particular, to a virtual image display apparatus which is suitable for a head-mounted display mounted to the head of the observer.

BACKGROUND ART

Various optical systems have been proposed as an optical system which is assembled in a virtual image display apparatus, such as a head-mounted display (hereinafter, referred to as an HMD) mounted to the head of an observer (see PTLs 1 to 4).

In regards to the virtual image display apparatus, such as an HMD, it is desirable to enlarge a viewing angle of video light and to reduce the size and weight. With the reduction in size and weight, it is possible to reduce the thickness in a visual axis direction of the observer and to bring the center of gravity close to the observer, thereby improving the fit.

If the field of view of the observer is completely covered and thus only video light is viewed, an external scene is not noticed by the observer, causing uneasiness for the observer. Furthermore, the external scene and video are displayed in an overlapping manner, various new usages, such as virtual reality, are produced. For this reason, there is a need for a display which displays video light in an overlapping manner without obstructing the field of view of the outside.

In order to improve the fit for the observer and to improve the appearance of the form, it is desirable to arrange a video display device across the face, instead of being disposed above the eyes.

In order to reduce the size of the optical system and to arrange the video display device in a position distant from the eyes of the observer so as not to obstruct the field of view, it is preferable to image display image light on the optical system once to form an intermediate image, and a relay optical system which enlarges the intermediate image to be displayed.

For example, PTL 1 proposes a relay optical system which uses a parallel planar light guide plate, in which a parabolic mirror is provided at an end surface thereof, and a projection lens, and forms an intermediate image inside the light guide plate. However, in case of the optical system of PTL 1, the projection lens is large in size, obstructing reduction in size and weight.

PTL 2 proposes an optical system which uses a light guide member having a curved emission and reflection surface, and a projection lens which makes video light enter the light guide member. However, the optical system of PTL 2 has no consideration of displaying an external scene to the observer. In order to display the external scene by applying the optical system, it is necessary to attach a compensation member to a reflection surface extending throughout the light guide member and to provide a half mirror on the bonding surface. However, since video light is reflected by the half mirror surface twice, video becomes very dark.

PTL 3 proposes a relay optical system which has a projection lens, a concave mirror, and a light guide plate. In this optical system, a wavelength plate and a polarization half mirror are combined, thereby enhancing reflection efficiency. However, in order to display an external scene by applying the optical system of PTL 3, it is necessary to attach a compensation lens to the outside of the concave mirror, resulting in an increase in thickness as a whole.

PTL 4 proposes a relay optical system which has a short total length and a compact arrangement due to a bent optical path. However, incase of the optical system of PTL 4, a convex portion at the center of the light guide member or a projection lens obstructs the field of view. Furthermore, since video light passes through a half mirror, is then returned and reflected by the half mirror again, and enters the eyes, video to be observed is darkened.

CITATION LIST

Patent Literature

[PTL 1]
  Japanese Patent No. 2746697
[PTL 2]
  Japanese Patent No. 3787399
[PTL 3]
  Japanese Patent No. 4218553
[PTL 4]
  Japanese Patent No. 4819532

SUMMARY OF INVENTION

Solution to Problem

An advantage of some aspects of the invention is to provide a small and lightweight virtual image display apparatus which has a wide viewing angle and high performance.

An aspect of the invention is directed to a virtual image display apparatus including a video element which generates video light, a light guide member which includes two or more non-axisymmetric curved surfaces and is a part of an optical system, an intermediate image being formed inside the light guide member, and a projection lens which makes video light from the video element enter the light guide member, in which the projection lens includes at least one non-axisymmetric aspheric surface, a first surface and a third surface among a plurality of surfaces constituting the light guide member are arranged to face each other, and video light from the video element is totally reflected by the third surface, is totally reflected by the first surface, is reflected by the second surface, is transmitted through the first surface, and reaches an observation side. Here, it is assumed that the two or more non-axisymmetric curved surfaces includes, for example, two or more curved surfaces which are main surfaces contributing to light guide, such as reflection of video light.

In the virtual image display apparatus described above, the light guide member includes the two or more non-axisymmetric curved surfaces, and the projection lens includes the non-axisymmetric aspheric surface. For example, a lot of free-form surfaces are used as the non-axisymmetric curved surfaces of the light guide member or the non-axisymmetric aspheric surface of the projection lens, whereby aberration correction can be achieved. With this, for example, even when there is a constraint on some surface shapes on the light guide member side to limit correction of asymmetric aberration, aberration correction is achieved using the non-axisymmetric aspheric surface provided on the projection lens side, whereby it is possible to perform sufficient aberration correction as the whole of the optical system and to realize a virtual image display apparatus which has a wide viewing angle and high performance and is made compact and lightweight with a thin light guide member. In regards to external light, the shapes of the first surface and the third surface are appropriately determined, whereby a diopter error (magnitude of diopter) or an apparent magnification error can be substantially zero. The shape of the light guide member can have a shape along the face of the observer, the center of gravity can be brought close to the face, and excellent design can be achieved.

In a specific aspect of the invention, in the light guide member, the first surface and the third surface are flat surfaces substantially in parallel with each other. In this case, in regards to external light which is observed through the first surface and the third surface, a diopter error can be substantially zero. In particular, an apparent magnification error regarding to an external scene image can be substantially zero, and the same state as a naked eye state can be provided. If the first surface and the third surface are flat surfaces parallel with each other, a diopter error and an apparent magnification error can be substantially zero.

In another aspect of the invention, the light guide member has a fourth surface which is arranged on a light incidence side from the third surface and guides video light toward the third surface, and a fifth surface which guides video light toward the fourth surface, and in the light guide member, the intermediate image is on the optical path of video light from the third surface to the fifth surface. In this case, it is possible to maintain the size balance between the front stage side and the rear stage side of the optical system with the intermediate image interposed therebetween to reduce the size as the whole of the optical system.

In still another aspect of the invention, in the light guide member, the second surface, the fourth surface, and the fifth surface are non-axisymmetric curved surfaces. In this case, even when the first surface or the third surface is substantially close to a flat surface and aberration correction is not easily achieved on the first surface or the third surface, it is possible to realize a configuration in which aberration can be sufficiently corrected on a different surface, such as the second surface.

In yet another aspect of the invention, the projection lens optical axis in the projection lens and a visual axis to be assumed as the direction of the eyes of the observer make an angle equal to or greater than 0 degree and equal to or less than 30 degrees. In this case, for example, when a configuration is made in which the video element is arranged across the face, instead of being disposed above the eyes, it is possible to improve the fit for the observer and to prevent the arrangement of the optical system from obstructing the maintenance of the appearance of the form in a better state.

In further another aspect of the invention, when an expression of a surface shape is expanded as a polynomial in terms of orthogonal coordinates x and y extending in a tangential direction from the origin with the origin of each surface constituting the optical system as a reference, and the coefficient of a term $x^m * y^n$ of a polynomial expression representing a k-th surface is $Ak_{m,n}$, the following conditions of (1) to (3) are satisfied.

[Math. 1]

$$-10^{-1} < A1_{0,2} + A1_{2,0} < 10^{-2} \text{ and } -10^{-1} < A3_{0,2} + A3_{2,0} < 10^{-2} \quad (1)$$

$$|A1_{2,0} - A1_{0,2}| < 10^{-1} \text{ and } |A3_{2,0} - A3_{0,2}| < 10^{-1} \quad (2)$$

$$|A1_{2,0} - A3_{2,0}| < 10^{-2} \text{ and } |A1_{0,2} - A3_{0,2}| < 10^{-2} \quad (3)$$

Here, a local coordinate (x,y,z) including the orthogonal coordinates x and y of each surface has a certain point on a curved surface (including a flat surface) as an origin, the z axis is in a direction normal to the surface, the x axis and the y axis are in a tangential direction of the surface, and the curved surface shape is specified in the local coordinate. It is assumed that the origin of the curved surface is, for example, a position through which the center of a light flux passes.

In this case, some surfaces of the projection lens have, for example, non-axisymmetric aspheric surface (irrotationally asymmetric aspheric surface) shape which has a free-form surface or the like, thereby succeeding in obtaining a high image quality optical system. For this reason, for example, even when the first surface and the third surface which involve the observation of external light as well as video light are flat surfaces, it is possible to perform sufficient aberration correction and make a diopter error or a magnification error substantially completely zero. For example, when the first surface and the third surface are free-form surfaces, the degree of freedom of these curved surfaces are effectively used to constitute a compact optical system.

The action of each of the first surface and the third surface, that is, the action of the curved surface is basically characterized by the curvature of the curved surface, and the curvature near the origin is primarily determined by the values of the coefficients $Ak_{2,0}$ and $Ak_{0,2}$ (where k=1, 3). For this reason, it is important to appropriately set the values of the coefficients $Ak_{2,0}$ and $Ak_{0,2}$.

The condition (1) specifies the magnitude of the curvature of the first surface and the curvature of the third surface near the origin. If the magnitude exceeds an upper limit of the condition (1), the first surface and the third surface have a convex shape to the observer, and accordingly, the whole shape increases and aberration correction is difficult. If the magnitude exceeds a lower limit of the condition (1), the curvature is excessively enhanced, aberration correction is not easily performed, and the position of the light guide member or the projection lens becomes close to the face, causing damage to the fit.

The condition (2) specifies the difference between the curvature in the x-axis direction and the curvature in the y-axis direction of the first surface and the third surface. If the difference exceeds an upper limit of the condition (2), astigmatism which is generated in the first surface and the third surface excessively increases, and aberration correction is difficult.

The condition (3) specifies the difference between the curvature of the first surface and the curvature of the third surface relating to the x-axis direction and the y-axis direction, and affects the diopter of the light guide member to external light. If the thickness of the light guide member is T and the refractive index is N, the diopter Dx in the x-axis direction and the diopter Dy in the y-axis direction on the optical axis of the light guide member are given by the following expressions.

[Math. 2]

$$Dx=2000(N-1)(A1_{2,0}-A3_{2,0}+(2T(N-1)/N)*A1_{2,0}*A3_{2,0})$$

$$Dy=2000(N-1)(A1_{0,2}-A3_{0,2}+(2T(N-1)/N)*A1_{0,2}*A3_{0,2})$$

In general, if an error of far diopter exceeds +/−1D, displeasure is caused, thus, it is desirable that the diopter of the light guide member is suppressed to +/−1D, and is suppressed to be equal to or less than +/−0.5D if possible. As in the above-described expressions, since the diopter on the optical axis is related to the thickness or refractive index of the light guide member, the diopter on the optical axis is not determined only by the values of aspheric coefficients. Meanwhile, if the coefficients are within a range which satisfies the condition (3), the diopter on the optical axis can be suppressed within a range of +/−1D.

The first surface and the third surface have the shape satisfying the conditions (1) to (3), whereby aberration correction of both external light and video light are performed satisfactorily and excellent image quality can be obtained.

In still further another aspect of the invention, when an expression of a surface shape is expanded as polynomial in terms of orthogonal coordinates x and y extending in a tangential direction from the origin with the origin of the non-axisymmetric aspheric surface of the projection lens as a reference, and when a coefficient of a term $x^m*y^n$ of a polynomial expression representing the non-axisymmetric aspheric surface is $A_{m,n}$, $A_{2,0}$ and $A_{0,2}$ are opposite signs and satisfy the following condition.

[Math. 3]

$$10^{-2}<|A_{2,0}-A_{0,2}| \quad (4)$$

In this case, the projection lens has a non-axisymmetric aspheric surface which has a non-axisymmetric free-form surface or the like, whereby it is possible to correct aberration, such as astigmatism, generated on the reflection surface of the light guide member, and to obtain excellent image quality.

In yet further another aspect of the invention, inside the light guide member, video light from the video element is guided by five times of reflection including at least two times of total reflection. In this case, it is possible to achieve both display of video light and see-through for visual recognition of external light, and to perform aberration correction of video light.

In still yet further another aspect of the invention, a half mirror is formed on the second surface, video light is provided to an observer, a light transmission member is arranged integrally outside of the second surface, diopter to external light is substantially set to 0, and external light and video light is provided to the observer in an overlapping manner. In this case, it is possible to reduce defocusing or distortion of external light to be observed over the second surface.

In a further aspect of the invention, the projection lens includes two or more axisymmetric aspheric surfaces as surfaces other than the non-axisymmetric aspheric surface. In this case, the projection lens is configured to include many axisymmetric aspheric surfaces, whereby it is possible to facilitate the production and assembling of the projection lens with other parts.

In a still further aspect of the invention, the optical system including the light guide member covers a part in front of the eyes of the observer, and a portion where the front of the eyes is not covered is provided.

In a yet further aspect of the invention, the video element has a signal light forming unit which emits signal light modulated corresponding to an image, and a scanning optical system which scans signal light entering from the signal light forming unit to emit signal light as scanning light.

(A) to (F) are diagrams illustrating aberration of the optical system of Example 1.

Figure 7:
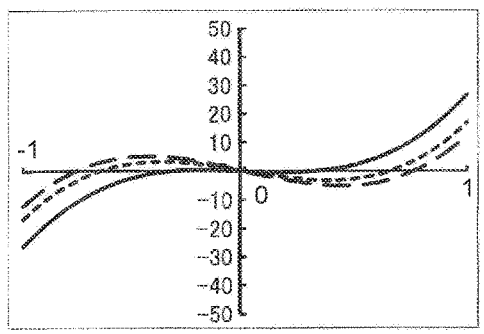
Figure 7:
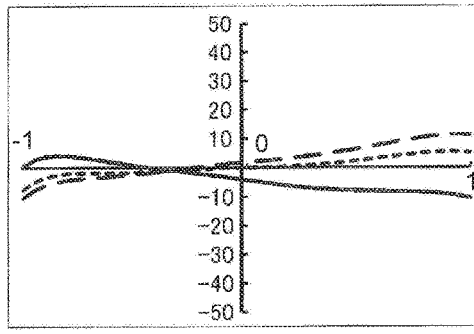
Figure 7:
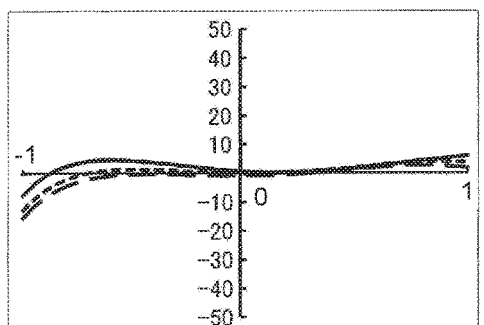
Figure 7:
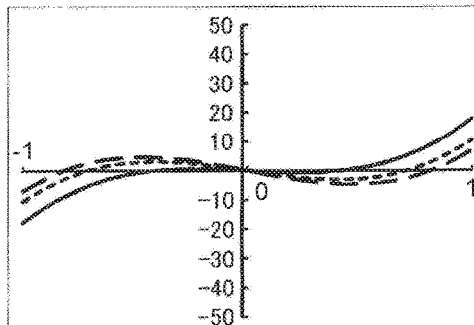
Figure 7:
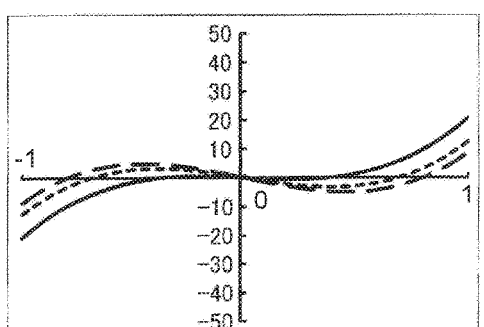
Figure 7:
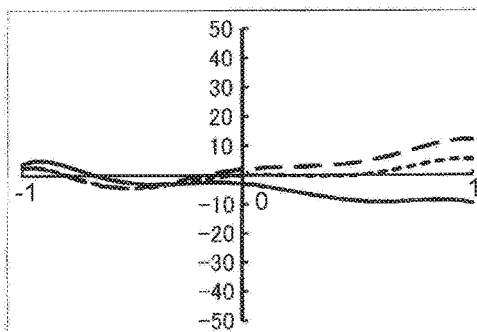

FIG. 7 (A) to (F) are diagram illustrating aberration of the optical system of Example 1.

Figure 8:
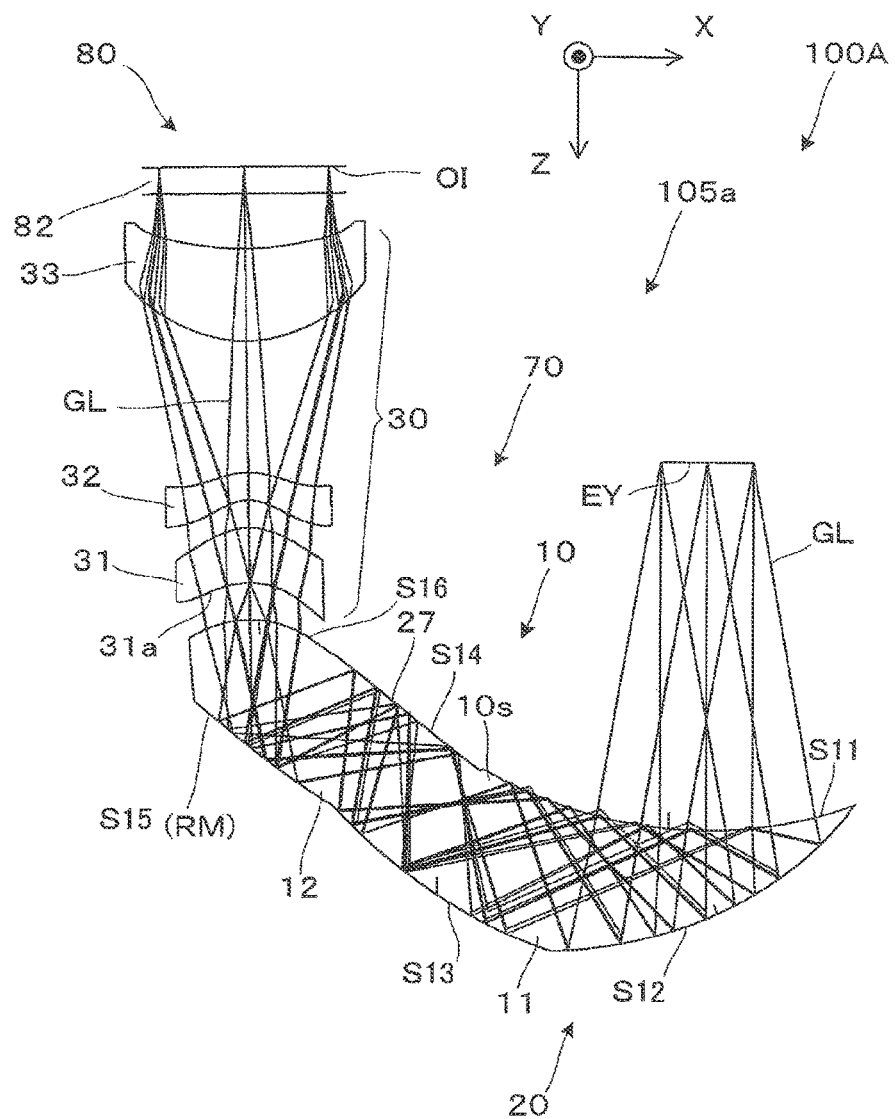

FIG. 8 is a diagram illustrating an optical system of Example 2.

Figure 9:
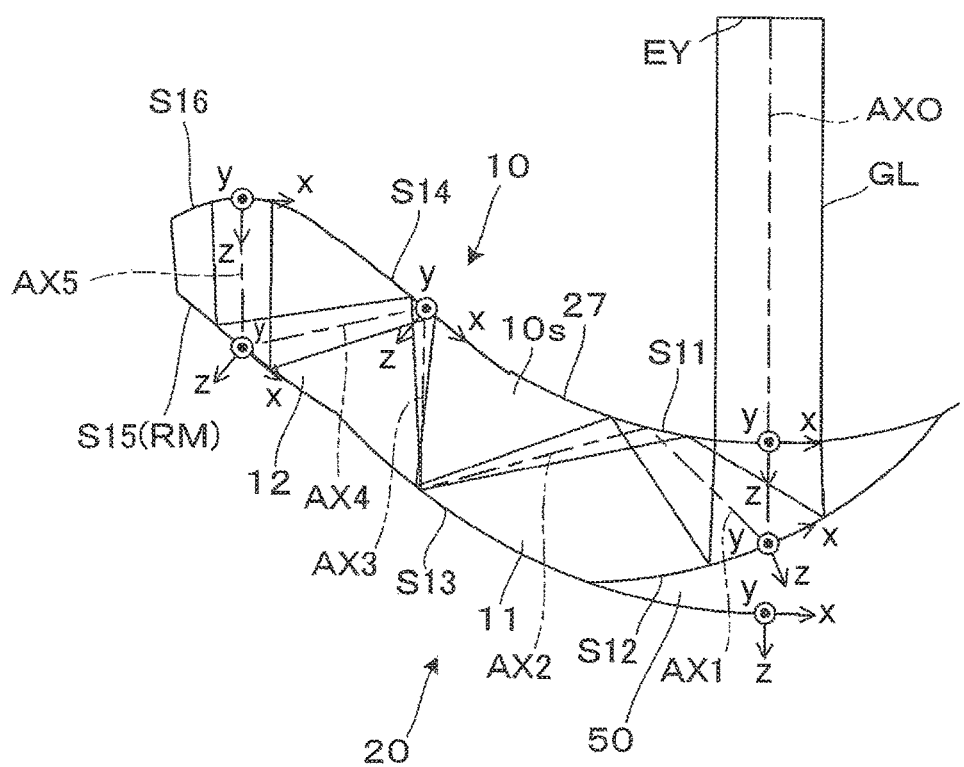

FIG. 9 is a sectional view illustrating an optical surface or an optical path in a light guide member of Example 2.

FIG. 10

(A) to (F) are diagrams illustrating aberration of the optical system of Example 2.

FIG. 11

(A) to (F) are diagrams illustrating aberration of the optical system of Example 2.

Figure 12:
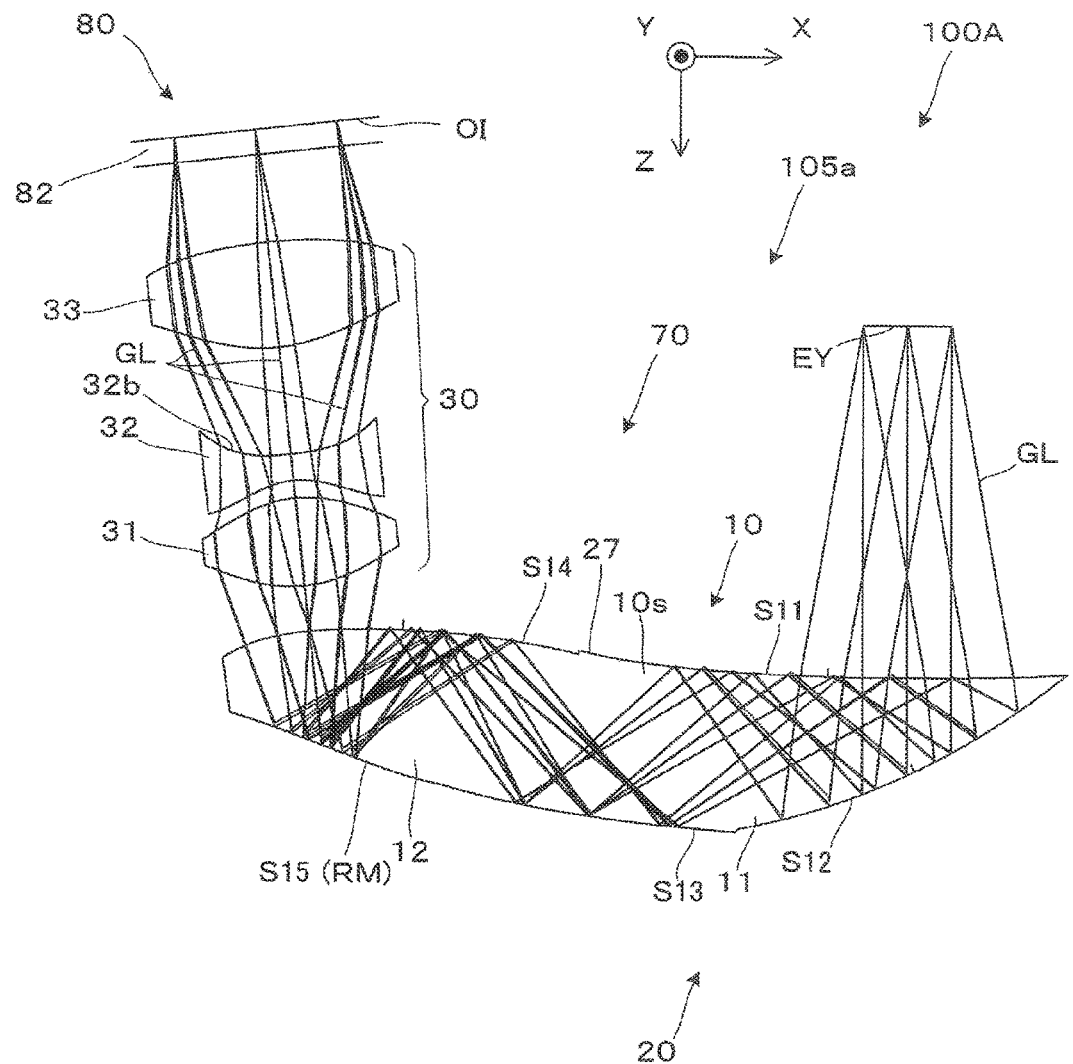

FIG. 12 is a diagram illustrating an optical system of Example 3.

Figure 13:
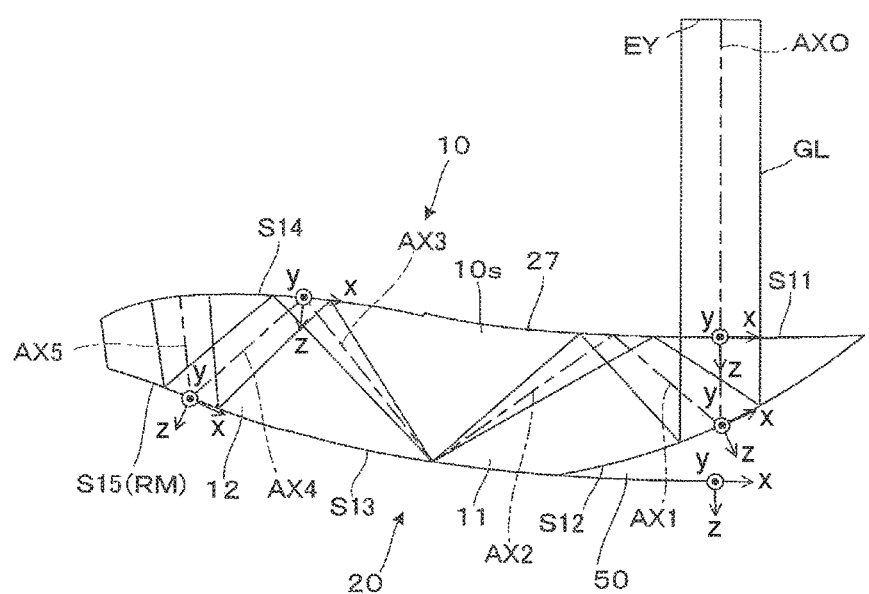

FIG. 13 is a sectional view illustrating an optical surface or an optical path in a light guide member of Example 3.

FIG. 14

(A) to (F) are diagrams illustrating aberration of the optical system of Example 3.

FIG. 15

(A) to (F) are diagrams illustrating aberration of the optical system of Example 3.

Figure 16:
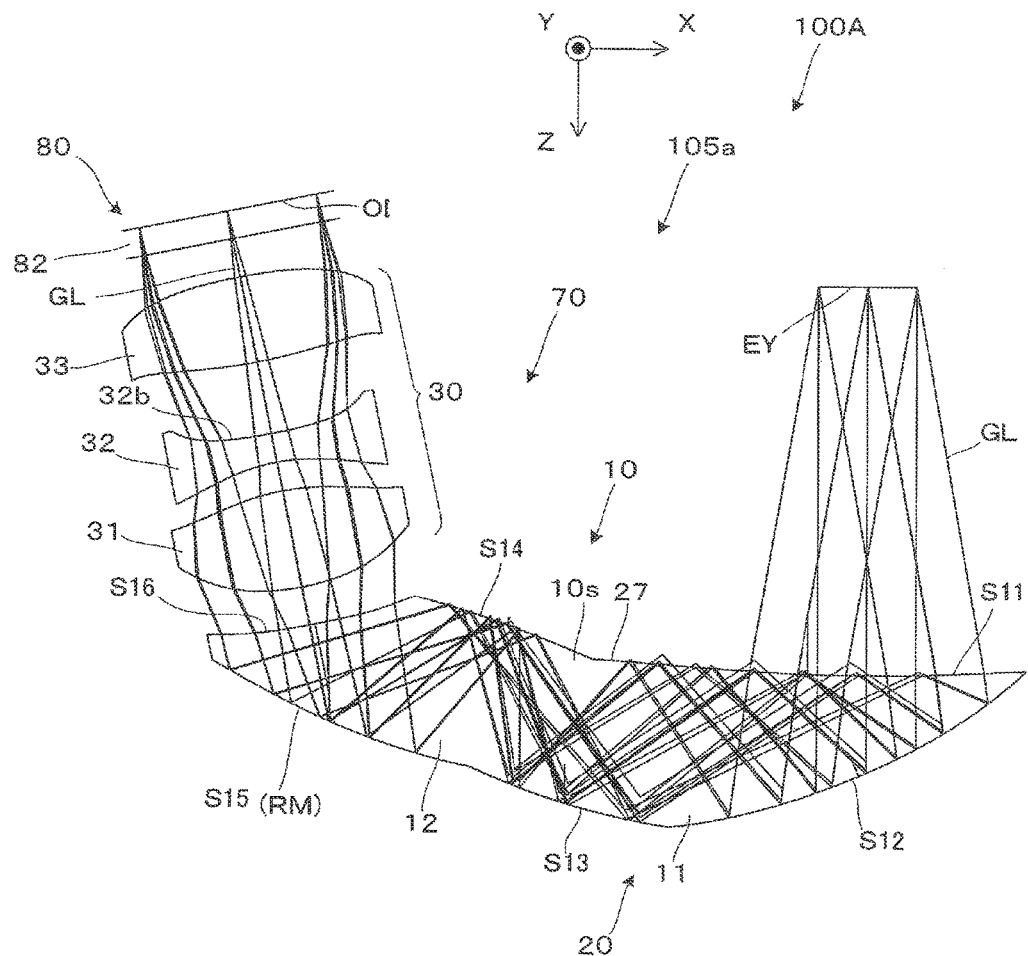

FIG. 16 is a diagram illustrating an optical system of Example 4.

Figure 17:
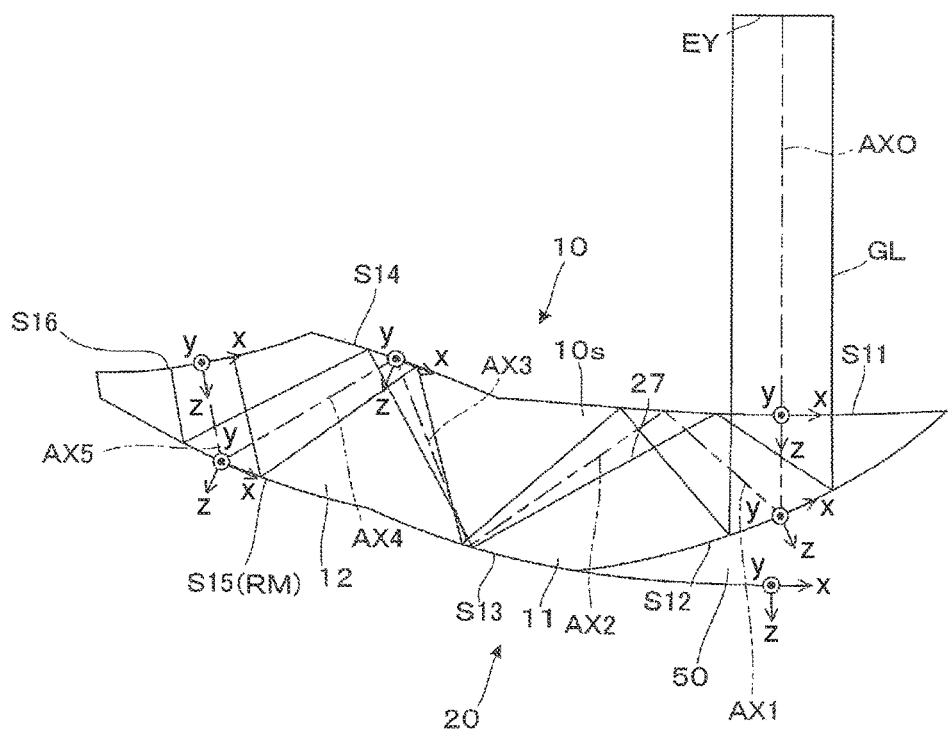

FIG. 17 is a sectional view illustrating an optical surface or an optical path in a light guide member of Example 4.

FIG. 18

(A) to (F) are diagrams illustrating aberration of the optical system of Example 4.

FIG. 19

(A) to (F) are diagrams illustrating aberration of the optical system of Example 4.

Figure 20:
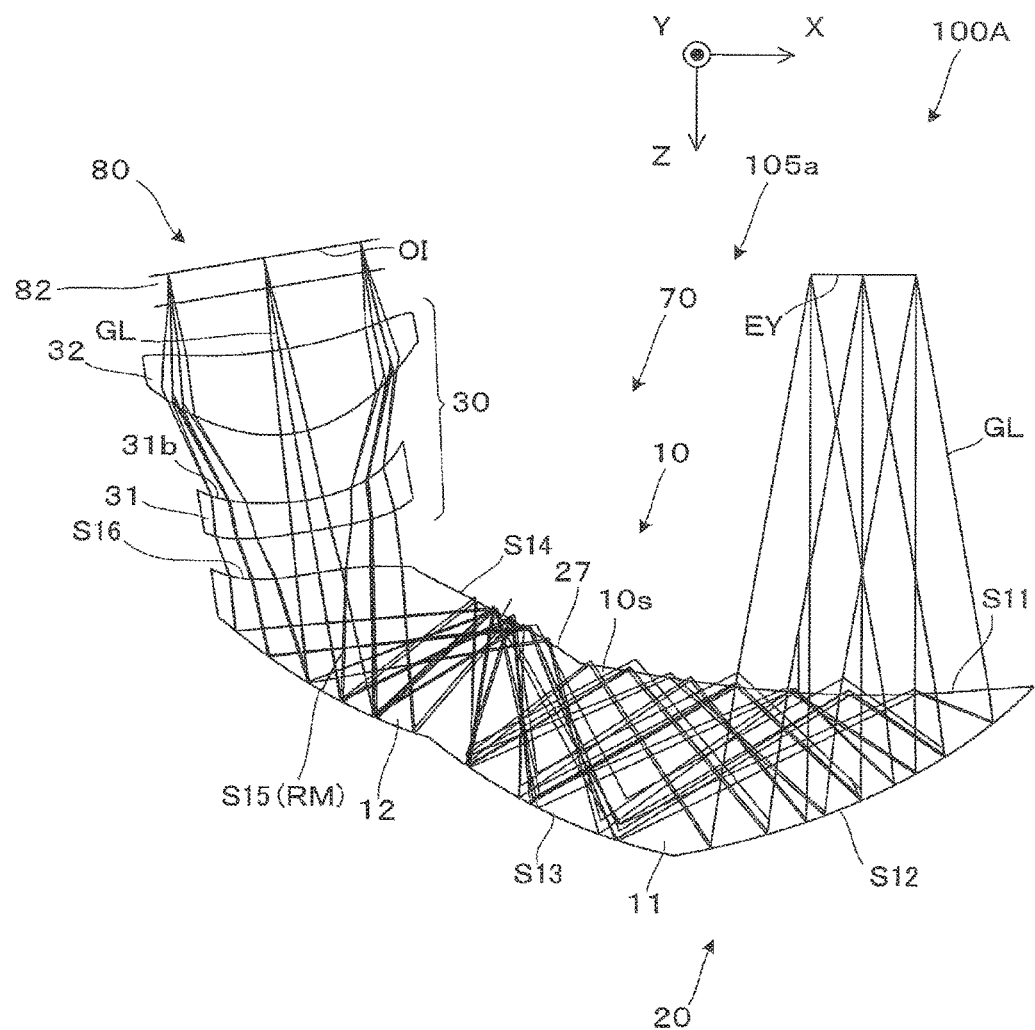

FIG. 20 is a diagram illustrating an optical system of Example 5.

Figure 21:
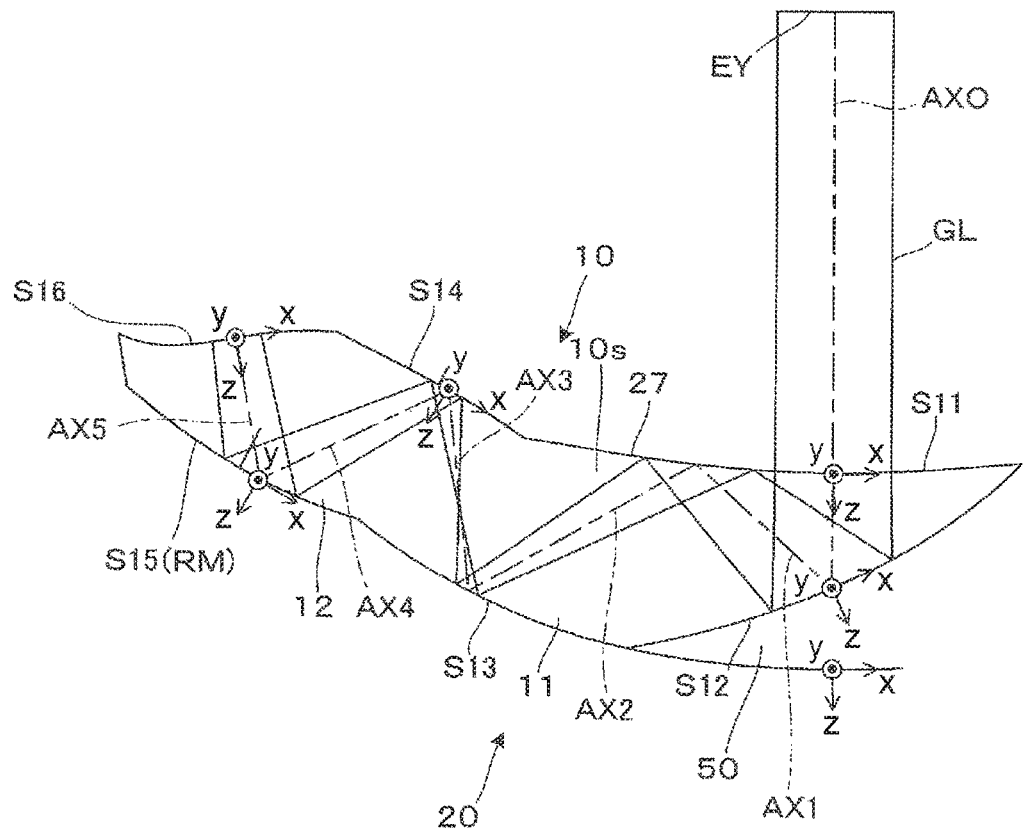

FIG. 21 is a sectional view illustrating an optical surface or an optical path in a light guide member of Example 5.

FIG. 22

(A) to (F) are diagrams illustrating aberration of the optical system of Example 5.

FIG. 23

(A) to (F) are diagrams illustrating aberration of the optical system of Example 5.

Figure 24:
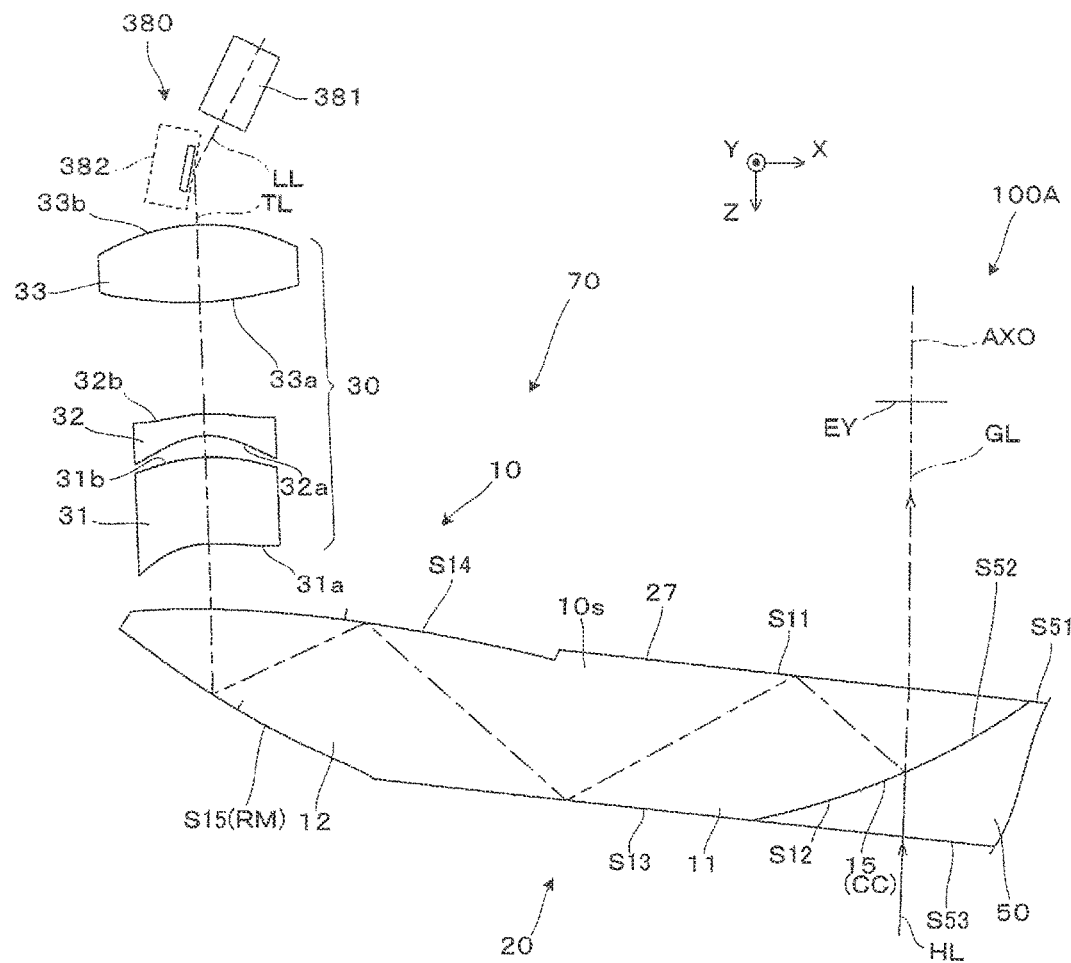

FIG. 24 is a diagram illustrating a virtual image display apparatus of a modification example.

Figure 25A:
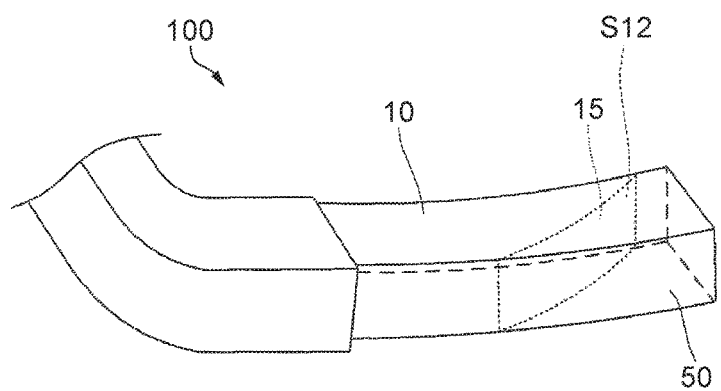

FIG. 25A is a perspective view illustrating another example of a light guide device and a virtual image display apparatus using the light guide device.

Figure 25B:
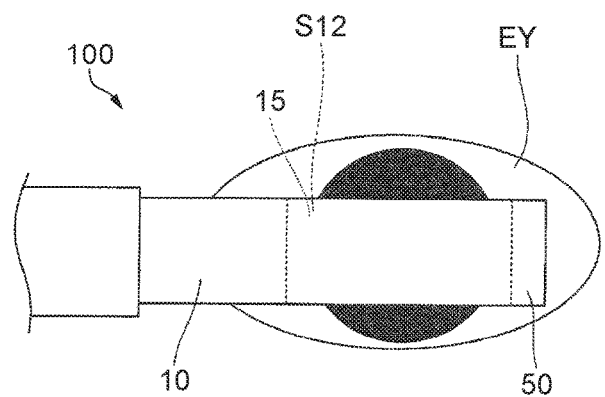

FIG. 25B is a front view of the light guide device and the virtual image display apparatus using the light guide device.

DESCRIPTION OF EMBODIMENTS

Hereinafter, an embodiment of a virtual image display apparatus according to the invention will be described in detail referring to FIG. 1 and the like.

Figure 1:
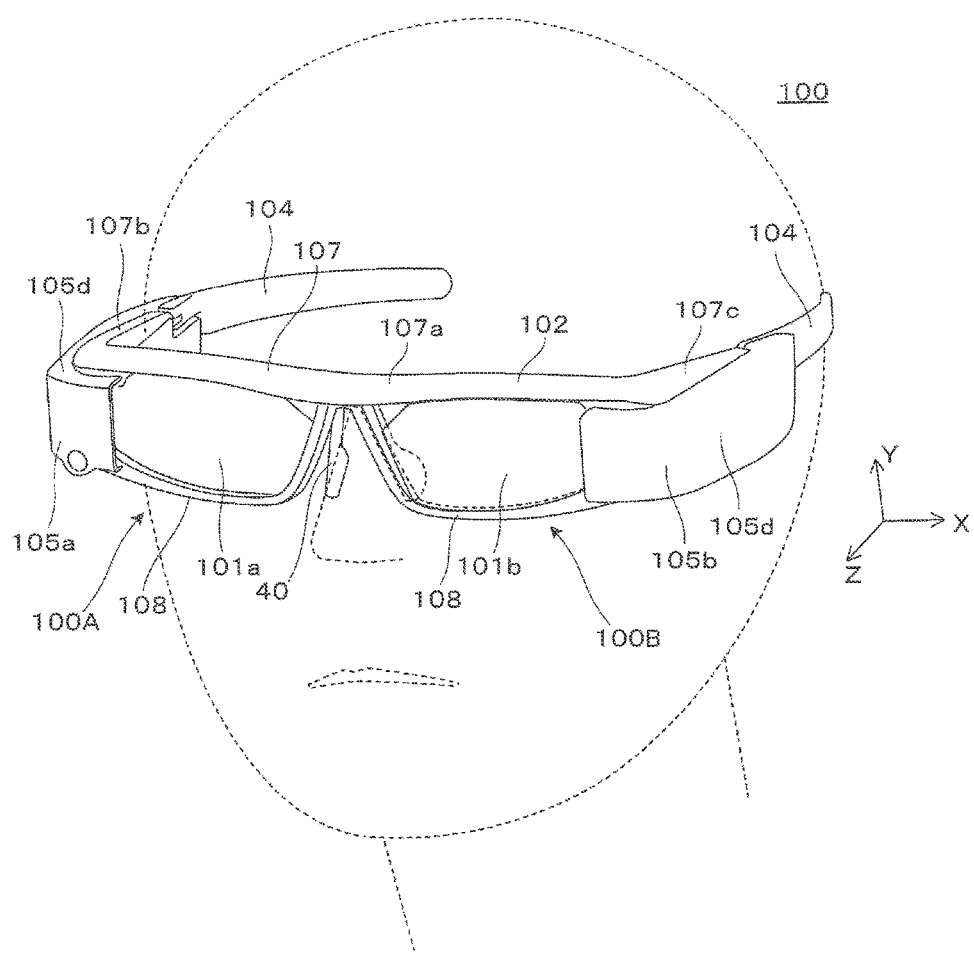
FIG. 1 is a perspective view illustrating the appearance of a virtual image display apparatus according to an embodiment of the invention.

As shown in FIG. 1, a virtual image display apparatus 100 of this embodiment is a head-mounted display which has an appearance like glasses, and can allow an observer or a user who the virtual image display apparatus 100 is mounted to visually recognize image light by a virtual image and allow the observer to visually recognize or observe an external scene image in a see-through manner. The virtual image display apparatus 100 includes first and second optical members 101a and 101b which cover the front of the eyes of the observer in a see-through manner, a frame part 102 which supports both optical members 101a and 101b, and first and second image forming body parts 105a and 105b which are attached to portions from both of left and right ends of the frame part 102 to rear temple parts (temples) 104. A first display device 100A in which the first optical member 101a and the first image forming body part 105a on the left side of the drawing are combined is a part which forms a virtual image for a left eye, and functions as a virtual image display apparatus singly. A second display device 100B in which the second optical member 101b and the second image forming body part 105b on the right side of the drawing are combined is a part which forms a virtual image for a left eye, and functions as a virtual image display apparatus singly.

Figure 2:
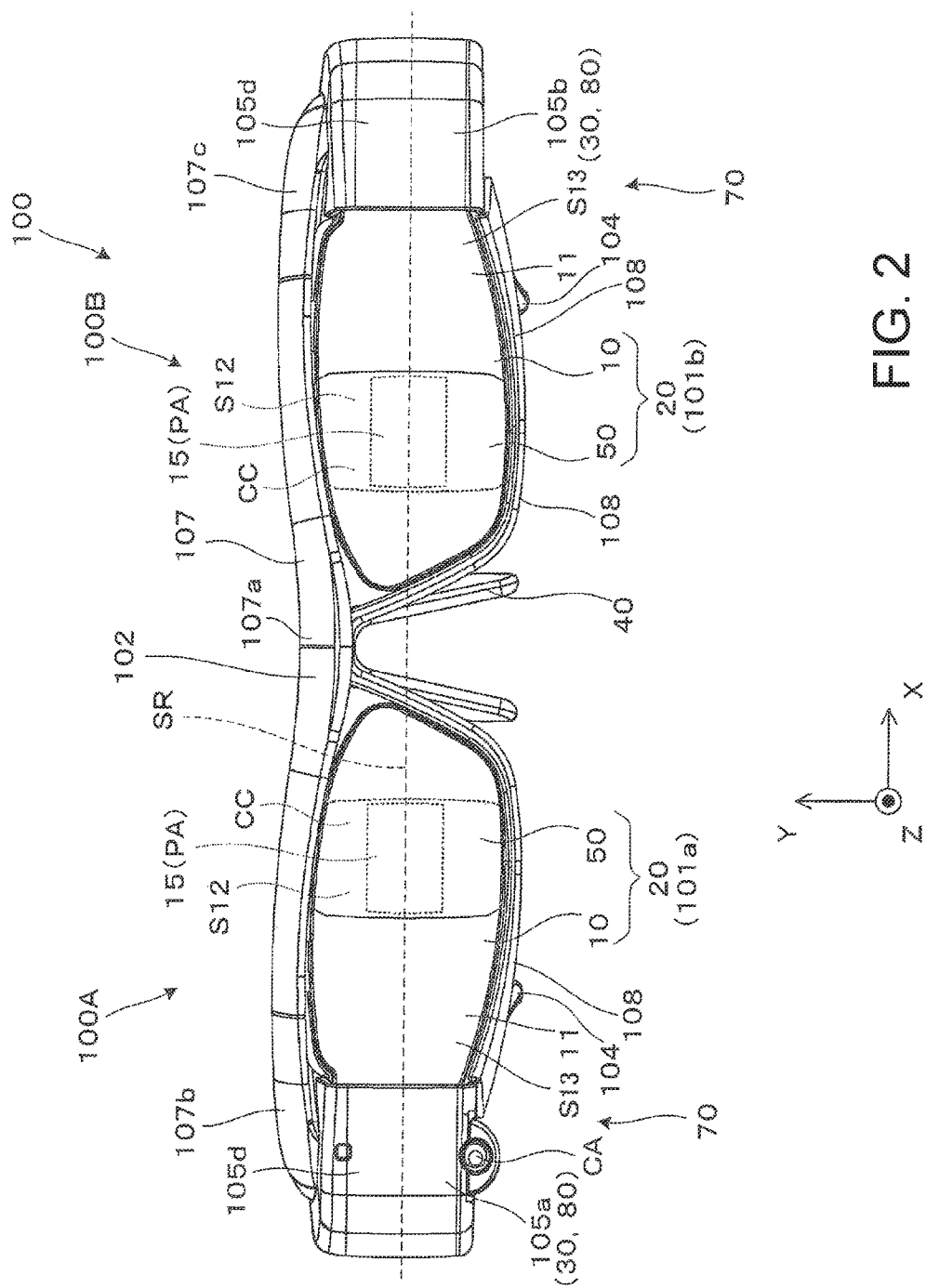
FIG. 2 is a front view showing the appearance of the virtual image display apparatus.

As shown in FIGS. 1 and 2, the frame part 102 provided in the virtual image display apparatus 100 includes a frame 107 which is arranged on an upper side, and a protector 108 which is arranged on a lower side. In the frame part 102, the frame 107 on the upper side is an elongated sheet-like member which is bent in a U shape within an XZ plane, and includes a front portion 107a which extends in a right-left horizontal direction (X direction), and a pair of side portions 107b and 107c which extend in a front-back depth direction (Z direction). The frame 107, that is, the front portion 107a and the side portions 107b and 107c are a metal integral component formed of aluminum die casting or various metal materials. The width in the depth direction (Z direction) of the front portion 107a is sufficiently greater than the thickness or width of the light guide device 20 corresponding to the first and second optical members 101a and 101b. On the left side of the frame 107, specifically, in a portion from a left end portion in the front portion 107a to the side portion 107b, the first optical member 101a and the first image forming body part 105a are aligned and directly fixed by, for example, screws to be thus supported. On the right side of the frame 107, specifically, in a portion from a right end portion in the front portion 107a to the side portion 107c, the second optical member 101b and the second image forming body part 105b are aligned and directly fixed by, for example, screws to be thus supported. The first optical member 101a and the first image forming body part 105a are aligned with each other by fitting, and the second optical member 101b and the second image forming body part 105b are aligned with each other by fitting. In the frame part 102, the protector 108 arranged on the lower side is an under rim-like member, and is arranged and fixed below the frame 107. The protector 108 is an elongated sheet-like member which is bent in a two-stage crank shape, and is integrally formed of a metal material or a resin material.

The frame 107 plays a part in not only supporting the first and second image forming body parts 105a and 105b but also protecting the inside of the first and second image forming body parts 105a and 105b in corporation with the exterior member 105d which covers the first and second image forming body parts 105a and 105b. The frame 107 and the protector 108 is separated from or is in loose contact with an elliptical peripheral portion of the light guide device 20 excluding the root side connected to the first and second image forming body parts 105a and 105b. For this reason, even if there is a difference in coefficient of thermal expansion between the central light guide device 20 and the frame part 102 including the frame 107 and the protector 108, expansion of the light guide device 20 inside the frame part 102 is permitted, whereby it is possible to prevent the occurrence of distortion, deformation, and damage of the light guide device 20.

A bridge part 40 is provided together with the frame 107. The bridge part 40 plays a part in coming into contact with the nose of the observer to support the frame part 102. That is, the frame part 102 is arranged in front of the face of the observer by the bridge part 40 supported by the nose and a pair of temple parts 104 supported by the ears. The bridge part 40 is fixed by screws to be sandwiched between the front portion 107a of the frame 107 constituting the frame part 102 and the central portion of the protector 108 constituting the frame part 102. The appearance illustrated with reference to FIG. 1 is an example, and the design of the mechanism fixed, for example, by screws and the like can be changed about the part not directly involved in the optical mechanism.

Figure 3:
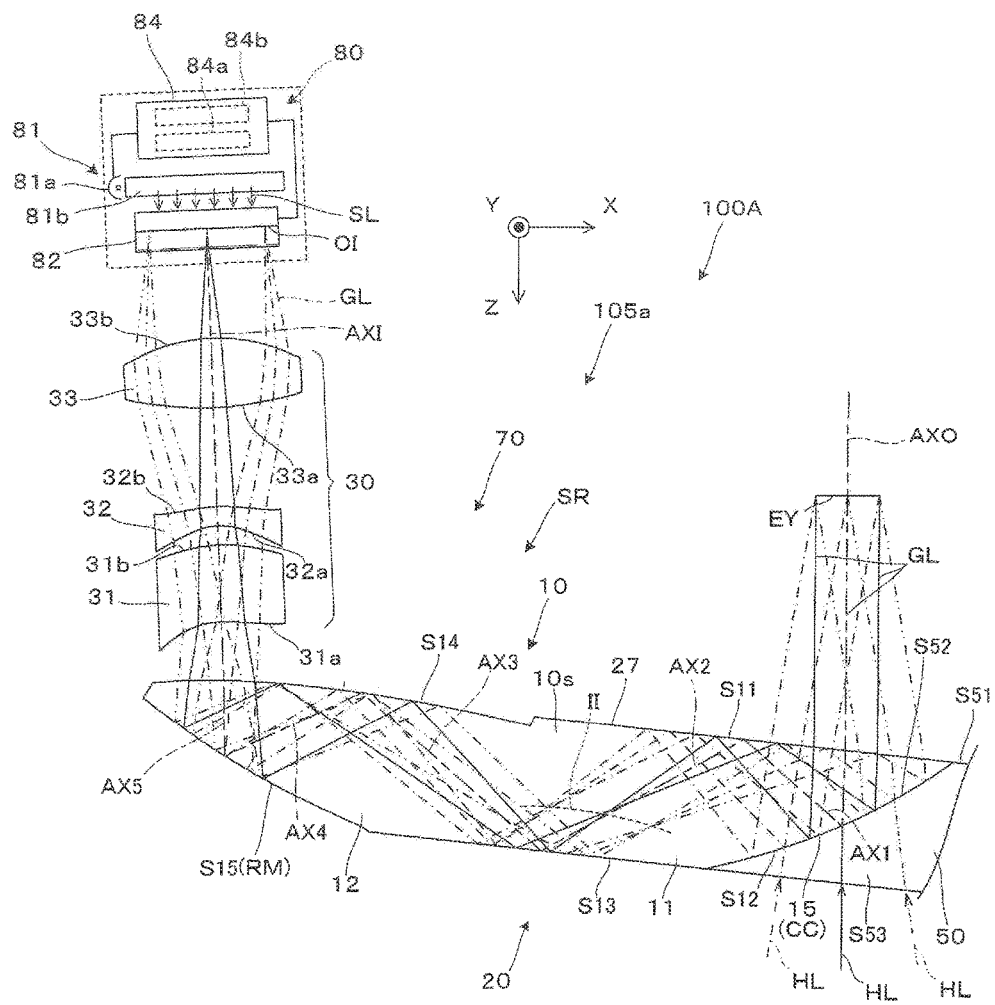
FIG. 3 is a sectional view of a main body portion of the first display device constituting the virtual image display apparatus in plan view.

As shown in FIGS. 2 and 3, the first display device 100A can be considered to include a projection see-through device 70 which is an optical system for projection, and an image display device 80 which forms video light. FIG. 3 shows across-section regarding a reference surface SR (see FIG. 2) which includes an optical axis AX of an optical system in the virtual image display apparatus 100. The projection see-through device 70 plays a part in projecting an image formed by the first image forming body part 105a on the eyes of the observer as a virtual image. The projection see-through device 70 includes a light guide member 10 for light guide and see-through, a light transmission member 50 for see-through, and a projection lens 30 for imaging. That is, the first optical member 101a or the light guide device 20 is constituted by the light guide member 10 and the light transmission member 50, and the first image forming body part 105a is constituted by the image display device 80 and the projection lens 30.

Hereinafter, the image display device 80 and the projection lens 30 constituting the first image forming body part 105a will be described referring to FIG. 3.

The image display device 80 has an illumination device 81 which emits illumination light, a video display element 82 which is a transmissive spatial light modulation device, and a drive control unit 84 which controls the operation of the illumination device 81 and the video display element 82.

The illumination device 81 of the image display device 80 has a light source 81a which generates light including three colors of red, green, and blue, and a backlight guide part 81b which diffuses light from the light source to convert light to alight flux having a rectangular cross-section. The video display element (video element) 82 is constituted by, for example, a liquid crystal display device, has a plurality of pixels, and spatially modulates illumination light from the illumination device 81 to form image light to be displayed, such as a motion image. The drive control unit 84 includes a light source drive circuit 84a and a liquid crystal drive circuit 84b. The light source drive circuit 84a supplies power to the illumination device 81 to emit illumination light with stable luminance. The liquid crystal drive circuit 84b outputs an image signal or a drive signal to the video display element (video element) 82, thereby forming color video light or image light to be a source of a motion image or a still image as a transmittance pattern. Although an image processing function can be provided in the liquid crystal drive circuit 84b, the image processing function may be provided in an external control circuit.

The projection lens 30 is a projection optical system which includes three optical elements 31 to 33 along an incidence-side optical axis AXI as components, and includes a lens barrel (not shown) which stores and supports the optical elements 31 and 33. The optical elements 31 to 33 are, for example, aspheric lenses which include both a non-axisymmetric aspheric surface and an axisymmetric aspheric surface, and forms an intermediate image corresponding to a display image of the video display element 82 inside the light guide member 10 in corporation with a part of the light guide member 10. A first lens 31 is a lens which is arranged on the light guide member 10 side, and has a lens surface 31a which is a light emission surface facing the light incidence surface in the light guide member 10 and a lens surface 31b which is a light incidence surface. A second lens 32 is arranged on the upper stage side of the first lens 31 on the optical path of light, and has a lens surface 32a which is a light emission surface and a lens surface 32b which is a light incidence surface. A third lens 33 is arranged on the upper stage side of the second lens 32 on the optical path of light, and has a lens surface 33a which is a light emission surface and a lens surface 33b which is a light incidence surface. The lens surface 33b of the third lens 33 becomes an incidence surface which faces the video display element 82. Here, in particular, the first lens 31 which is one of the three optical elements has the lens surface 31a which is a non-axisymmetric aspheric surface. The non-axisymmetric aspheric surface means a surface which is non-axisymmetric, that is, not rotationally symmetric and not spherical, and representatively, a free-form surface having no symmetry or the like is provided. For example, a non-axisymmetric aspheric surface, such as an anamorphic aspheric surface, which is not rotationally symmetrical and has two symmetrical cross-sections may be provided. In the projection lens 30, five lens surfaces 31b, 32a, 32b, 33a, and 33b excluding the lens surface 31a are axisymmetric aspheric surfaces. That is, the projection lens 30 includes two or more axisymmetric aspheric surfaces as surfaces other than the non-axisymmetric aspheric surface. The projection lens 30 includes more axisymmetric aspheric surfaces than the non-axisymmetric aspheric surface, whereby it is possible to avoid difficulty in producing the projection lens 30 or assembling the projection lens 30 in another member to the utmost.

Hereinafter, the function, operation, and the like of the projection see-through device 70 and the like will be described in detail referring to FIG. 3. In the projection see-through device 70, the light guide member 10 which is a part of the prism-type light guide device 20 is a member in which a portion on a peripheral side close to the ear (separated from the nose) has, for example, an arc shape bent to follow the face in plan view, and a portion on a central side (the front side of the eye) close to the nose has a linear shape. In the light guide member 10, a first light guide portion 11 is arranged on the center side near the nose, that is, a light emission side, and has a first surface S11, a second surface S12, and a third surface S13 as a lateral surface having an optical function. A second light guide portion 12 is arranged on a peripheral side separated from the nose, that is, a light incidence side, and has a fourth surface S14 and a fifth surface S15 as a lateral surface having an optical function. Of these, the first surface S11 and the fourth surface S14 are continuously adjacent to each other, and the third surface S13 and the fifth surface S15 are continuously adjacent to each other. The second surface S12 is arranged between the first surface S11 and the third surface S13, and the fourth surface S14 and the fifth surface S15 are adjacent to each other at a large angle. Here, the first surface S11 and the third surface S13 arranged to face each other have flat surface shape substantially in parallel with each other. On the other hand, other surfaces having an optical function, that is, the second surface S12, the fourth surface S14, and the fifth surface S15 become non-axisymmetric curved surfaces (free-form surfaces).

Hereinafter, each surface constituting the light guide member 10 will be described in detail. In the light guide member 10, the first surface S11 is a flat surface which has, as a local z axis, an emission-side optical axis AXO parallel to the Z axis, the second surface S12 is a free-form surface which has, as a local z axis, an optical axis AX1 included in a reference surface (a cross-section in the drawing) parallel to the XZ plane and inclined with respect to the Z axis, and the third surface S13 is a flat surface which has, as a local z axis, the emission-side optical axis AXO. The fourth surface S14 is a free-form surface which has, as a local z axis, an optical axis parallel to a bisector of a pair of optical axes AX3 and AX4 included in the reference surface parallel to the XZ plane and inclined with respect to the Z axis, and the fifth surface S15 is a free-form surface which has, as a local z axis, an optical axis parallel to a bisector of a pair of optical axes AX4 and AX5 included in the reference surface parallel to the XZ plane and inclined with respect to the Z axis. On the extension of the optical axis AX5 on the fifth surface S15 side, an incidence-side optical axis AXI is arranged. The first to fifth surfaces S11 to S15 have a symmetrical shape in terms of the vertical Y-axis direction while sandwiching the reference surface (the cross-section in the drawing), which is in parallel with the XZ plane extending in a horizontal direction and through which the optical axes AX1 to AX5 and the like pass.

Among a plurality of surfaces constituting the light guide member 10, at least one free-form surface of the surfaces S14 and S15 other than a surface from the first surface S11 to the third surface S13 includes at least one point different in sign of curvature depending on direction. With this, it is possible to reduce the size of the light guide member 10 while controlling the light guide of video light accurately.

In the light guide member 10, a main body 10s is formed of a resin material having a high light transmission property in a visible region, and is molded by injecting and solidifying thermoplastic resin inside a mold. As the material of the main body 10s, for example, cycloolefin polymer or the like may be used. Although the main body 10s is an integrated product, as described above, the guide member 10 can be considered in the first light guide portion 11 and the second light guide portion 12 functionally. The first light guide portion 11 enables light guide and emission of video light GL and enables see-through of external light HL. The second light guide portion 12 enables incidence and light guide of video light GL.

In the first light guide portion 11, the first surface S11 functions as a refraction surface which emits video light GL outside the first light guide portion 11 and functions as a total reflection surface which totally reflects video light GL on the inner surface side. The first surface S11 is arranged in front of an eye EY, and as described above, has a flat surface shape. The first surface S11 is a surface which is formed of a hard coat layer 27 on the surface of the main body 10s.

The second surface S12 is the surface of the main body 10s, and a half mirror layer 15 is attached thereto. The half mirror layer 15 is a reflection film (that is, transflective film) having a light transmission property. The half mirror layer (transflective film) 15 is formed on a narrowed partial area PA of the second surface S12 in terms of the vertical direction along the Y axis of the instead of the entire second surface S12 (see FIG. 2). The half mirror layer 15 is formed by forming a metal reflection film or a dielectric multilayer film on the partial area PA of the underlayer surface of the main body 10s. The reflectance of the half mirror layer 15 to video light GL is set to be equal to or greater than 10% and equal to or less than 50% within an assumed incidence angle range of video light GL from the viewpoint of facilitating the observation of external light HL in a see-through manner. Specifically, the reflectance of the half mirror layer 15 to video light GL in a specific example is set to, for example, 20%, and the transmittance of the half mirror layer 15 of video light GL is set to, for example, 80%.

The third surface S13 functions as a total reflection surface which totally reflects video light GL on the inner surface side. The third surface S13 is arranged in front of the eye EY, and, similarly to the first surface S11, has a flat surface shape. The first surface S11 and the third surface S13 are surfaces in parallel with each other, whereby, when external light HL passing through the first surface S11 and the third surface S13 is viewed, diopter is substantially 0. In particular, variable magnification does not occur. The third surface S13 is a surface which is formed of the hard coat layer 27 on the surface of the main body 10s.

In the second light guide portion 12, the fourth surface S14 functions as a total reflection surface which totally reflects video light GL on the inner surface side. The fourth surface S14 also functions as a refraction surface which makes video light GL enter the second light guide portion 12. That is, the fourth surface S14 doubles as a light incidence surface which makes video light GL enter the light guide member 10 from the outside, and a reflection surface which makes video light GL propagate through the light guide member 10. The fourth surface S14 is a surface which is formed of the hard coat layer 27 on the surface of the main body 10s.

In the second light guide portion 12, the fifth surface S15 is formed by forming a light reflection film RM formed of an inorganic material on the surface of the main body 10s, and functions as a reflection surface.

As described above, in this embodiment, inside the light guide member 10, video light from the video display element 82 is guided from the first surface S11 to the fifth surface S15 by five times of reflection including at least two times of total reflection. With this, it is possible to achieve both display of video light GL and see-through for visual recognition of external light HL, and to perform aberration correction of video light GL.

In the above-described configuration, the incidence-side optical axis AXI which is the projection lens optical axis in the projection lens 30 and the emission-side optical axis AXO which corresponds to the visual axis to be assumed as the direction of the eyes of the observer make an angle equal to or greater than 0 degree and equal to or less than 30 degrees. With this, as in this embodiment, for example, when a configuration is made in which the video display element 82 is arranged across the face, instead of being disposed above the eye EY of the observer, it is possible to improve the fit for the observer and to prevent the arrangement of the optical system from obstructing the maintenance of the appearance of the form in a better state.

As described above, the light transmission member 50 is fixed integrally with the light guide member 10 and is constituted as the single light guide device 20. The light transmission member 50 is a member (auxiliary optical block) which assists a see-through function of the light guide member 10, and has a first transmission surface S51, a second transmission surface S52, and a third transmission surface S53 as a lateral surface having an optical function. The second transmission surface S52 is arranged between the first transmission surface S51 and the third transmission surface S53. The first transmission surface S51 is on a surface extended from the first surface S11 of the light guide member 10, the second transmission surface S52 is a curved surface which is bonded integrally to the second surface S12 by an adhesive layer CC, and the third transmission surface S53 is on a surface extended from the third surface S13 of the light guide member 10. Of these, the second transmission surface S52 and the second surface S12 of the light guide member 10 are integrated by bonding through the thin adhesive layer CC, and thus have a shape having the substantially same curvature.

The light transmission member (auxiliary optical block) 50 exhibits a high light transmission property in a visible region, and a main body portion of the light transmission member 50 is formed of thermoplastic resin having the substantially same refractive index as the main body 10s of the light guide member 10. The light transmission member 50 is formed by hard coat deposition along with the main body 10s in a state where the main body portion is bonded to the main body 10s of the light guide member 10. That is, similarly to the light guide member 10, in the light transmission member 50, a hard coat layer 27 is formed on the surface of the main body portion. The first transmission surface S51 and the third transmission surface S53 are surfaces which are formed of the hard coat layer 27 on the surface of the main body portion.

Hereinafter, the optical path of video light GL or the like in the virtual image display apparatus 100 will be described. Video light GL emitted from the video display element (video element) 82 is converged when passing through the lenses 31 to 33 constituting the projection lens 30 and enters the fourth surface S14 having positive refractive power which is given intended astigmatism and provided in the light guide member 10. The astigmatism is cancelled while passing through each surface of the light guide member 10, and finally, video light is emitted toward the eyes of the observer in an initial state.

Video light GL which enters and passes through the fourth surface S14 of the light guide member 10 advances while being converged, when passing through the second light guide portion 12, is reflected by the fifth surface S15 having comparatively weak positive refractive power, enters the fourth surface S14 from the inside again, and is then reflected.

Video light GL reflected by the fourth surface S14 of the second light guide portion 12 enters and is totally reflected by the third surface S13 substantially having no refractive power in the first light guide portion 11 to be totally reflected, and enters and is totally reflected by the first surface S11 substantially having no refractive power.

Before and after passing through the third surface S13, video light GL forms an intermediate image in the light guide member 10. An image surface II of the intermediate image corresponds to an image surface CI of the video display element 82. Although an image surface II of an intermediate image shown in the drawing is formed on the optical path of video light from the third surface S13 to the fourth surface S14, the image surface II may be formed at other positions, and in this embodiment, it is assumed that the image surface II is formed on the optical path of video light from the third surface S13 to the fifth surface S15.

While video light GL totally reflected by the first surface S11 enters the second surface S12, in particular, video light GL entering the half mirror layer 15 is partially transmitted through and partially reflected by the half mirror layer 15 and enters and passes through the first surface S11 again. The half mirror layer 15 acts as having comparatively strong positive refractive power to video light GL to be reflected by the half mirror layer 15. The first surface S11 acts as having no refractive power to video light GL passing therethrough.

Video light GL passing through the first surface S11 enters the pupil of the eye EY of the observer or an equivalent position as a substantially parallel light flux. That is, the observer observes an image formed on the video display element (video element) 82 by video light GL as a virtual image.

On the other hand, out of external light HL, a light component which enters a −X side from the second surface S12 of the light guide member 10 passes through the third surface S13 and the first surface S11 of the first light guide portion 11. At this time, the third surface S13 and the first surface S11 are flat surfaces substantially in parallel with each other, whereby aberration or the like is rarely generated. That is, the observer observes an external scene image with no distortion over the light guide member 10. Similarly, out of external light HL, a light component which enters a +X side from the second surface S12 of the light guide member 10, that is, enters the light transmission member 50 passes through the third transmission surface S53 and the first transmission surface S51 provided in the light transmission member 50. At this time, the third transmission surface S53 and the first transmission surface S51 are flat surfaces substantially in parallel with each other, no aberration or the like is generated. That is, the observer observes an external scene image with no distortion over the light transmission member 50. Out of external light HL, a light component which enters the light transmission member 50 corresponding to the second surface S12 of the light guide member 10 passes through the third transmission surface S53 and the first surface S11. At this time, the third transmission surface S53 and the first surface S11 are flat surfaces substantially in parallel with each other, whereby aberration or the like is rarely generated. That is, the observer observes an external scene image with little distortion over the light transmission member 50. The second surface S12 of the light guide member 10 and the second transmission surface S52 of the light transmission member 50 have the substantially same curved surface shape and the substantially same refractive index, and the gap between both surfaces is filled with the adhesive layer CC having the substantially same refractive index. That is, the second surface S12 of the light guide member 10 or the second transmission surface S52 of the light transmission member 50 does not act as a refraction surface to external light HL.

However, since external light HL entering the half mirror layer 15 is partially transmitted through and partially reflected by the half mirror layer 15, external light HL from a direction corresponding to the half mirror layer 15 is vulnerable to the transmittance of the half mirror layer 15. On the other hand, since video light GL is entered from a direction corresponding to the half mirror layer 15, the observer observes an external scene image along with an image formed on the video display element (video element) 82 in the direction of the half mirror layer 15.

Out of video light GL which propagates through the light guide member 10 and enters the second surface S12, a light component which has not been reflected by the half mirror layer 15 enters the light transmission member 50, and is prevented from being returned to the light guide member 10 by an antireflection portion (not shown) provided in the light transmission member 50. That is, video light GL passing through the second surface S12 is prevented from being returned on the optical path and becoming stray light. Furthermore, external light HL which enters from the light transmission member 50 side and reflected by the half mirror layer 15 is returned to the light transmission member 50, and is prevented from being emitted to the light guide member 10 by the antireflection portion (not shown) provided in the light transmission member 50. That is, external light HL reflected by the half mirror layer 15 is prevented from being returned on the optical path and becoming stray light.

Figure 4:
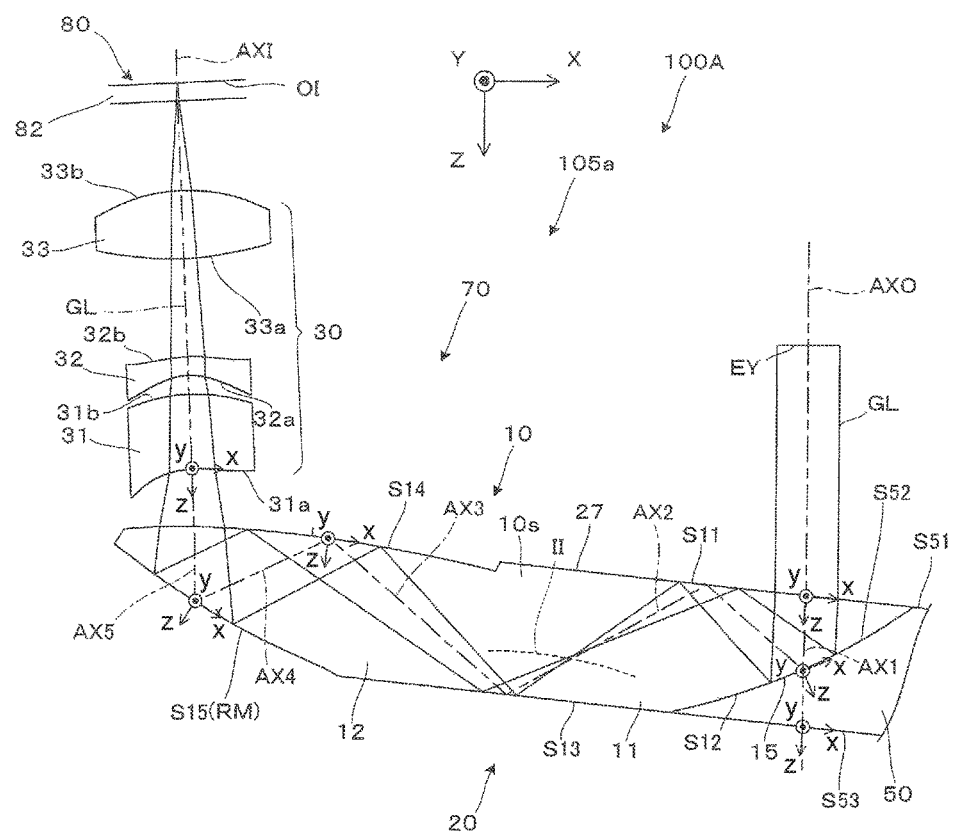
FIG. 4 is a sectional view illustrating an optical surface or an optical path in a light guide member of the first display device.

FIG. 4 is a diagram illustrating the optical axes AX1 to AX4 in the light guide member 10 or local coordinates. In the following description, considering the evaluation of the optical system or convenience of expression, an optical surface or an optical path is specified in terms of a reversing direction from the eye EY of the observer toward the video display element 82 of the image display device 80. In an actual optical system, while light emitted from the video display element 82 sequentially passes through the projection lens 30 and the light guide member 10 and reaches the eye EY, in this state, the evaluation of the optical system is difficult. For this reason, evaluation and design are performed assuming that light from an infinitely distant light source from a stop at the position of the eye EY enters the light guide member 10 and is imaged on the video display element 82 through the projection lens 30, and data of the optical system described below in detail is displayed in this order. The light transmission member 50 which is bonded to the light guide member 10 and used integrally is the extension of the shape of the light guide member 10, and description thereof will be omitted.

In the light guide member 10 shown in the drawing, the optical axis of the first surface S11 matches the emission-side optical axis AXO, and the local coordinate (x,y,z) of the first surface S11 has a translational relationship with a global coordinate (X,Y,Z) and has an origin on the first surface S11. That is, a z direction of the local coordinate is an advancing direction (a reversing direction of a light beam) on the emission-side optical axis AXO, and a y direction of the local coordinate is in parallel with the Y direction of the global coordinate. In the subsequent surfaces, the y direction of the local coordinate is in parallel with the Y direction of the global coordinate.

The optical axis of the second surface S12 is appropriately inclined with respect to the emission-side optical axis AXO, and the local coordinate of the second surface S12 is appropriately rotated around the Y axis and translated with respect to the global coordinate and has an origin on the second surface S12. A z direction of the local coordinate of the second surface S12 is an intermediate direction between the emission-side optical axis AXO and the optical axis AX1 at the center of a light flux from the second surface S12 toward the first surface S11.

The optical axis of the third surface S13 matches the emission-side optical axis AXO, and the local coordinate of the third surface S13 has a translational relationship with the global coordinate and has an origin on the extended surface of the third surface S13, that is, on the third transmission surface S53.

With the above, an intermediate direction between the optical axis AX1 at the center of a light flux from the second surface S12 toward the first surface S11 and the optical axis AX2 at the center of from the first surface S11 toward the third surface S13 matches a direction normal to the first surface S11 at the center (an intersection point of the optical axes AX1 and AX2) of a light flux on the first surface S11. An intermediate direction between the optical axis AX2 at the center of a light flux from the first surface S11 toward the third surface S13 and the optical axis AX3 at the center of a light flux from the third surface S13 toward the fourth surface S14 matches a direction normal to the third surface S13 at the center (an intersection point of the optical axes AX2 and AX3) of a light flux on the third surface S13.

In an optical path from the third surface S13 toward the next fourth surface S14, the local coordinate corresponds to an advancing direction (a reversing direction of a light beam). That is, a z direction of the local coordinate from the third surface S13 to the fourth surface S14 matches the optical axis AX3 at the center of the light flux, and a y direction of the local coordinate is in parallel with the Y direction of the global coordinate.

The origin of the local coordinate of the fourth surface S14 is on the fourth surface S14. A z direction of the local coordinate of the fourth surface S14, that is, the optical axis of the fourth surface S14 is a bisector of the optical axis AX3 at the center of the light flux from the third surface S13 toward the fourth surface S14 and the optical axis AX4 at the center of the light flux from the fourth surface S14 toward the fifth surface S15.

The origin of the local coordinate of the fifth surface S15 is on the fifth surface S15. A z direction of the local coordinate of the fifth surface S15, that is, the optical axis of the fifth surface S15 is a bisector of the optical axis AX4 at the center of the light flux from the fourth surface S14 toward the fifth surface S15 and the optical axis AX5 at the center of the light flux from the fifth surface S15 toward the fourth surface S14.

The shape of the first surface S11 of the light guide member 10 is expressed by the following expression using the local coordinate (x,y,z) of the first surface S11.

[Math. 4]

$$z=\Sigma\{A1_{m,n}*(x^m*y^n)\} \quad (5)$$

Here, $A1_{m,n}$ is a coefficient of a (m*n)th term expanded as a polynomial, and m and n are an integer equal to or greater than 0.

However, in the example shown in FIGS. 3 and 4, the first surface S11 has a flat surface shape, and each coefficient $A1_{m,n}$ becomes 0.

The shape of the second surface S12 of the light guide member 10 is expressed by the following expression using the local coordinate (x,y,z) of the second surface S12.

[Math. 5]

$$z=\Sigma\{A2_{m,n}*(x^m*y^n)\} \quad (6)$$

Here, $A2_{m,n}$ is a coefficient of a (m*n)th term expanded as a polynomial.

The shape of the third surface S13 of the light guide member 10 is expressed by the following expression using the local coordinate (x, y, z) of the third surface S13.

[Math. 6]

$$z=\Sigma\{A3_{m,n}*(x^m*y^n)\} \quad (7)$$

Here, $A3_{m,n}$ is a coefficient of a (m*n)th term expanded as a polynomial.

However, in the example shown in FIGS. 3 and 4, the third surface S13 has a flat surface shape, and each coefficient $A1_{m,n}$ becomes 0.

In this embodiment, the first to third surfaces S11 to S13 of the light guide member 10 satisfy the following three conditions.

[Math. 7]

$$-10^{-1}<A1_{0,2}+A1_{2,0}<10^{-2} \text{ and } -10^{-1}<A3_{0,2}+A3_{2,0}<10^{-2} \quad (1)$$

$$|A1_{2,0}-A1_{0,2}|<10^{-1} \text{ and } |A3_{2,0}-A3_{0,2}|<10^{-1} \quad (2)$$

$$|A1_{2,0}-A3_{2,0}|<10^{-2} \text{ and } |A1_{0,2}-A3_{0,2}|<10^{-2} \quad (3)$$

The shapes of the first to third surfaces S11 to S13 are set to satisfy the three conditions, whereby aberration correction of both external light HL and video light GL can be performed satisfactorily and excellent image quality can be obtained.

An interval between the first surface S11 and the third surface S13 of the light guide member 10 is equal to or greater than 5 mm and equal to or less than 15 mm. An inclination angle of the second surface S12 with respect to the first surface S11 is equal to or greater than 20 degrees and equal to or less than 40 degrees.

The fourth surface S14 or the fifth surface S15 of the light guide member 10 is provided for optical path adjustment or more accurate aberration correction.

The shape of the fourth surface S14 of the light guide member 10 is expressed by the following expression using the local coordinate (x,y,z) of the fourth surface S14.

[Math. 8]

$$z=\Sigma\{A4_{m,n}*(x^m*y^n)\} \quad (8)$$

Here, $A4_{m,n}$ is a coefficient of a (m*n)th term expanded as a polynomial.

The shape of the fifth surface S15 of the light guide member 10 is expressed by the following expression using the local coordinate (x,y,z) of the fifth surface S15.

[Math. 9]

$$z=\Sigma\{A5_{m,n}*(x^m*y^n)\} \quad (9)$$

Here, $A5_{m,n}$ is a coefficient of a (m*n)th term expanded as a polynomial.

In this embodiment, the fourth surface S14 or the fifth surface S15 expressed by Expression (8) or (9) is an opposite-sign curvature surface which includes at least one opposite-sign curvature point different in sign of curvature depending on direction.

In this embodiment, as described above, the light guide member 10 has a free-form surface, such as the second surface S12, and the projection lens 30 has a non-axisymmetric aspheric surface which is a free-form surface, thereby achieving aberration correction.

Hereinafter, a non-axisymmetric aspheric surface (free-form surface) included in the projection lens 30 will be described. The first lens 31 which faces the light guide member 10 among the three lenses 31 to 33 constituting the projection lens 30 has the lens surface 31a which is a non-axisymmetric aspheric surface (free-form surface). Similarly, the shape of the lens surface 31a is specified based on the local coordinate. Specifically, the origin of the local coordinate of the lens surface 31a is on the lens surface 31a. The z direction of the local coordinate of the lens surface 31a, that is, the optical axis of the lens surface 31a matches the incidence-side optical axis AXI connected to an intersection point (passing point) of the optical axis AX5 and the fourth surface S14, and the y direction of the local coordinate is in parallel with the Y direction of the global coordinate.

The shape of the lens surface 31a of the first lens 31 is expressed by the following expression using the local coordinate (x,y,z) of the lens surface 31a.

[Math. 10]

$$z = \Sigma\{A_{m,n} * (x^m * y^n)\} \quad (10)$$

Here, $A_{m,n}$ is a coefficient of a (m*n)th term expanded as a polynomial.

In this embodiment, in regards to the lens surface 31a of the projection lens 30, in Expression (10), the coefficients $A_{2,0}$ and $A_{0,2}$ are opposite signs, and satisfy the following relationship.

[Math. 11]

$$10^{-2} < |A_{2,0} - A_{0,2}| \quad (4)$$

In this case, as described above, aberration, such as astigmatism, generated on the reflection surface of the light guide member 10 is corrected by the lens surface 31a which is a non-axisymmetric aspheric surface of the projection lens 30, whereby obtaining excellent image quality can be obtained.

As described above, in this embodiment, the light guide member 10 includes two or more non-axisymmetric curved surfaces (in the drawing, corresponding to the three surfaces of the second surface S12, the fourth surface S14, and the fifth surface S15, and these surfaces are curved surfaces which perform reflection or the like of video light GL and contribute to light guide of video light GL), and the projection lens 30 includes the lens surface 31a as a non-axisymmetric aspheric surface. With this, on the light guide member 10 side, even when there is a shape constraint that the first surface S11 or the third surface S13 which is a surface contributing to light guide is a flat surface, and correction of asymmetric aberration is limited, it becomes possible to perform sufficient aberration correction as the whole of an optical system including the projection lens 30. Therefore, the virtual image display apparatus 100 can have a wide viewing angle and high performance, and can be made small and lightweight. In the above-described virtual image display apparatus 100, the first surface S11 and the third surface S13 in the light guide member 10 are flat surfaces substantially in parallel with each other, whereby in regards to external light, a diopter error can be substantially zero. In particular, an apparent magnification error can be substantially zero, and the same state as a naked eye state can be provided. Here, the magnification error refers to an error which occurs when an external scene image is viewed on an enlarged or reduced scale compared to an actual external scene image when viewing through a light transmission member, such as the light guide member. External light which is observed through a light transmission member undergoes a magnification error more or less because the member has a curved surface having finite curvature or because of the thickness, reflectance, or the like of the member, excluding a case where a perfect flat surface is provided. In the above-described case, the first surface S11 and the third surface S13 are flat surfaces, whereby the apparent magnification error can be zero.

In the virtual image display apparatus 100 of this embodiment, an intermediate image is formed inside the light guide member 10 by the projection lens 30 or the like, and video light GL totally reflected by two or more surfaces in an order of the third surface S13, the first surface S11, and the second surface S12 is transmitted through the first surface S11 and reaches the eye EY of the observer. Thus, it is possible to realize bright high-performance display with a wide viewing angle while reducing the thickness of the light guide member 10, which extends to deflect in the horizontal direction, to reduce the size and weight of the entire optical system. External light HL can be observed through the first surface S11 and the third surface S13, and diopter at this time is substantially 0. For this reason, it is possible to reduce defocusing or distortion of external light HL when observing external light HL in a see-through manner. The shape of the light guide member 10 can have a shape along the face of the observer, the center of gravity can be brought close to the face, and excellent design can be achieved. In particular, the fourth surface S14 or the like other which is a surface other than the first surface S11 and the third surface S13 is a curved surface having a point different in curvature depending on the direction along the surface, whereby it is possible to reduce the size of the light guide member 10, consequently, the size and weight of the entire virtual image display apparatus 100.

In the above description, although a case where the first surface S11 or the third surface S13 in the light guide member 10 is a flat surface has been described, as described in examples (Examples 2 to 5) described below, each surface including the first surface S11 or the third surface S13 may be a non-axisymmetric curved surface. In this case, the curved surface shape of the first surface S11 or the third surface S13 is specified based on, for example, the coefficients expressed by Expressions (5) and (7).

EXAMPLES

Hereinafter, examples of the projection see-through device assembled in the virtual image display apparatus according to the invention will be described. Symbols used in each example are summarized below.

SPH: pupil
FFSk: free-form surface (k in light guide member or projection optical system=surface number provided that a flat surface may be included in part)
ASPk: axisymmetric aspheric surface (k in projection optical system=surface number)
SPH: spherical surface or flat surface (protection glass surface)
R: radius of curvature
T: axial surface interval
Nd: refractive index of optical material with respect to d line
Vd: Abbe number of optical material with respect to d line
TLY: inclination angle (degree) of optical axis on a cross-section (XZ cross-section) of specific surface (TLY may vary before and after a specific surface)

DCX: deviation of optical axis in X-axis direction on cross-section (XZ cross-section) of specific surface Example 1

In a projection see-through device of Example 1, data on an optical surface constituting a light guide member and a projection lens (projection optical system) is shown in Table 1. Here, a light beam reversed with respect to the advancement of video light from the position of the eye is traced, and measurement is performed. For example, FFS1 means the first surface S11, FFS2 means the second surface S12, and FFS3 means the third surface S13. However, FFS6 means the lens surface 31a which is the emission surface of the first lens of the projection lens. ASP1 means the incidence surface of the first lens of the projection lens, not the emission surface, and ASP2 means the emission surface of the second lens.

TABLE 1

| No | Type | R | T | Nd | Vd |
|---|---|---|---|---|---|
| 1 | SPH | ∞ | 20.00 | | |
| 2 | FFS1 | — | 5.80 | 1.525 | 55.95 |
| 3 | FFS2 | — | −5.80 | 1.525 | 55.95 |
| 4 | FFS1 | — | 10.46 | 1.525 | 55.95 |
| 5 | FFS3 | — | −22.70 | 1.525 | 55.95 |
| 6 | FFS4 | — | 11.90 | 1.525 | 55.95 |
| 7 | FFS5 | — | −11.90 | 1.525 | 55.95 |
| 8 | FFS4 | — | −4.00 | | |
| 9 | FFS6 | — | −6.00 | 1.525 | 55.95 |
| 10 | ASP1 | 12.481 | −1.50 | | |
| 11 | ASP2 | 4.805 | −1.50 | 1.585 | 29.90 |
| 12 | ASP3 | 11.556 | −7.86 | | |
| 13 | ASP4 | −21.429 | −5.50 | 1.525 | 55.95 |
| 14 | ASP5 | 14.518 | −7.17 | | |

TABLE 1-continued

| No | Type | R | T | Nd | Vd |
|---|---|---|---|---|---|
| 15 | SPH | ∞ | −1.44 | 1.458 | 67.82 |
| 16 | image surface | ∞ | | | |

In regards to the optical surface in the light guide member constituting Example 1, the optical axis inclination angle (tilt) TLY on the cross section and the optical axis deviation (decenter) DCX are shown in Table 2. As for the fourth surface S14, the inclination of the angle in a second pass is considered.

TABLE 2

| No | Type | TLY (before surface) | DCX (after surface) | TLY (after surface) |
|---|---|---|---|---|
| 2 | FFS1 | 6.00 | 0.0 | −6.00 |
| 3 | FFS2 | −23.80 | 0.0 | 23.80 |
| 4 | FFS1 | 6.00 | 0.0 | −6.00 |
| 5 | FFS3 | 0.00 | 21.017 | −49.13 |
| 6 | FFS4 | 57.00 | 0.0 | 57.00 |
| 7 | FFS5 | −33.14 | 0.0 | 33.14 |
| 8 | FFS4 | −57.00 | 11.1 | −10.54 |

In regards to each optical surface in the light guide member constituting Example 1, the coefficient $Ak_{m,n}$ expanded as a polynomial of a free-form surface (including a flat surface) and the coefficient $A_{m,n}$ expanded as a polynomial of a non-axisymmetric aspheric surface among the optical surfaces in the projection lens are shown in Table 3. In Table 3, symbols m and n means variables or degrees in the coefficients $Ak_{m,n}$ and $A_{m,n}$. A symbol FFSk (where k=1 to 5) means a k-th surface among the first to fifth surfaces S11 to S15 which are free-form surfaces. A symbol FFSk (where k=6) means the lens surface 31a which is a non-axisymmetric aspheric surface. The coefficient $Ak_{m,n}$ means a coefficient of each term $x^m*y^n$ which constitutes a polynomial expression representing the k-th surface. The coefficient $A_{m,n}$ means a coefficient of each term $x^m*y^n$ which constitutes a polynomial representing a target non-axisymmetric aspheric surface. The local coordinate of each surface corresponds to that shown in FIG. 4 and is thus not shown.

TABLE 3

| m | n | FFS1 | FFS2 | FFS3 | FFS4 | FFS5 | FFS6 |
|---|---|---|---|---|---|---|---|
| 2 | 0 | 0.000E+00 | −1.022E−02 | 0.000E+00 | 4.123E−03 | −8.095E−03 | 4.988E−02 |
| 0 | 2 | 0.000E+00 | −6.893E−03 | 0.000E+00 | −2.202E−02 | −1.460E−02 | −6.964E−02 |
| 3 | 0 | 0.000E+00 | 7.391E−05 | 0.000E+00 | 5.313E−05 | 8.235E−05 | 8.078E−03 |
| 1 | 2 | 0.000E+00 | −4.499E−05 | 0.000E+00 | −4.275E−04 | −3.510E−04 | 1.797E−03 |
| 4 | 0 | 0.000E+00 | 3.103E−06 | 0.000E+00 | 7.092E−07 | 7.476E−06 | −2.521E−06 |
| 2 | 2 | 0.000E+00 | 1.392E−06 | 0.000E+00 | 4.810E−06 | 4.087E−06 | −9.609E−05 |
| 0 | 4 | 0.000E+00 | −2.613E−06 | 0.000E+00 | 2.576E−05 | −4.143E−06 | −1.309E−05 |
| 5 | 0 | 0.000E+00 | −2.486E−07 | 0.000E+00 | 7.194E−10 | 1.820E−07 | −4.563E−05 |
| 3 | 2 | 0.000E+00 | 3.186E−08 | 0.000E+00 | 4.702E−07 | 3.550E−07 | −1.970E−05 |
| 1 | 4 | 0.000E+00 | 7.163E−09 | 0.000E+00 | 8.729E−06 | 2.656E−06 | 8.421E−07 |
| 6 | 0 | 0.000E+00 | 2.178E−10 | 0.000E+00 | 7.446E−09 | 5.327E−08 | −2.740E−06 |
| 4 | 2 | 0.000E+00 | −1.078E−08 | 0.000E+00 | −5.639E−08 | 9.558E−08 | −8.605E−06 |
| 2 | 4 | 0.000E+00 | −2.276E−08 | 0.000E+00 | 2.788E−08 | 6.075E−08 | −5.448E−06 |
| 0 | 6 | 0.000E+00 | 3.809E−08 | 0.000E+00 | 3.443E−07 | 4.320E−08 | −2.304E−06 |

In Table 3 and subsequent tables, digits after E in a numerical value mean a decimal exponent, and for example, "−1.022E−02" means $-1.022*10^{-02}$.

Coefficients of an aspheric surface of the optical surface (an axisymmetric aspheric surface which is a surface other than the lens surface 31a as the non-axisymmetric aspheric surface) constituting the projection lens in the projection see-through device of Example 1 are shown in Table 4.

TABLE 4

|     | ASP1       | ASP2       | ASP3       | ASP4       | ASP5       |
| --- | ---------- | ---------- | ---------- | ---------- | ---------- |
| K   | −1         | −1         | −1         | −1         | −1         |
| B4  | 8.020E−05  | −1.715E−03 | −1.436E−03 | 6.904E−05  | 8.135E−06  |
| B6  | −1.419E−05 | 1.991E−05  | 2.417E−05  | 5.163E−06  | 5.766E−06  |
| B8  | 2.289E−07  | −7.623E−08 | −3.857E−07 | −1.057E−07 | −9.395E−08 |

In Table 4, symbols K and Bi represent coefficients for specifying aspheric surfaces with the symbols ASP1 to ASP5 which are lens surfaces other than the lens surface 31a among the three lenses 31, 32, 33 constituting the projection lens 30. An aspheric surface is specified by the following polynomial expression (aspheric surface expression).

[Math. 12]
$$z = \frac{(1/R) \times h^2}{1 + \sqrt{1 - (K+1) \times (1/R)^2 \times h^2}} + B_4 h^4 + B_6 h^6 + B_8 h^8 + \ldots$$

Here, R represents a radius of curvature of each surface, h represents the height from the optical axis, K represents a conical coefficient of a target lens surface, and Bi (where i=4, 6, 8, . . . ) represents a high-order aspheric surface coefficient of the target lens surface.

Figure 5:
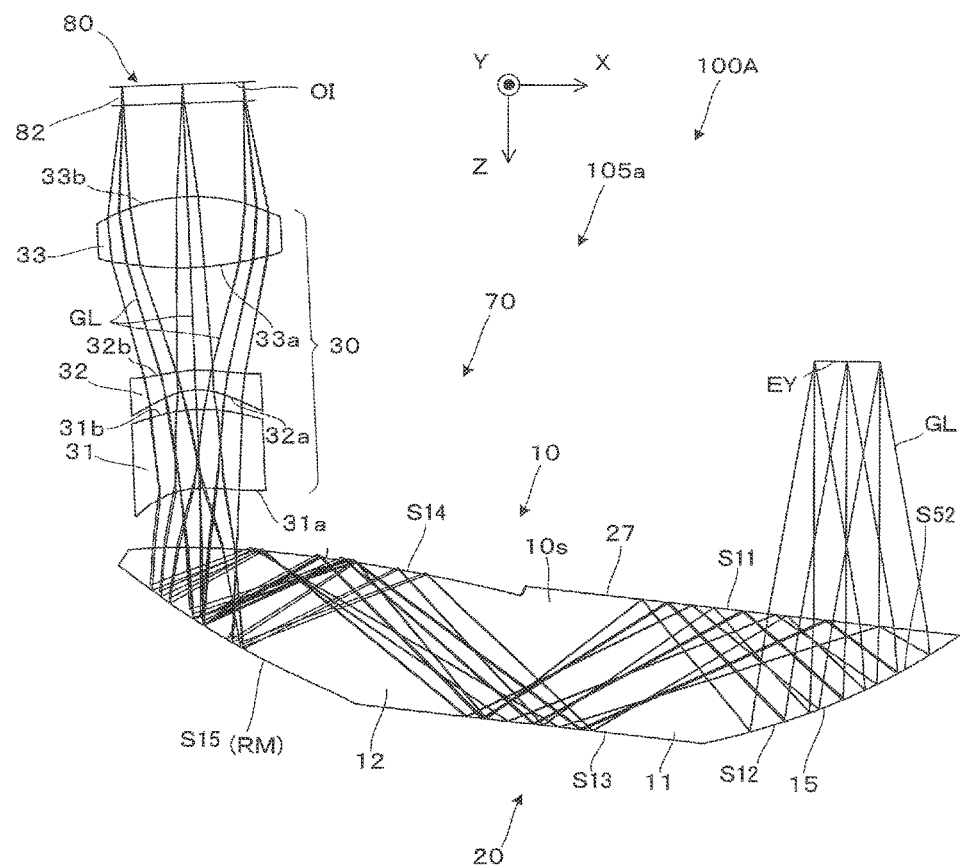
FIG. 5 is a diagram illustrating an optical system of Example 1.

FIG. 5 is a sectional view of the projection see-through device 70 of Example 1. However, a light flux is deviated not only on a reference surface SR but also in the Y direction from the reference surface SR. In the projection see-through device 70, the light guide member 10 includes the first surface S11 substantially having no refractive power, the second surface S12 having comparatively strong positive refractive power, the third surface S13 substantially having no refractive power, the fourth surface S14 having comparatively strong positive refractive power, and the fifth surface S15 having comparatively weak negative refractive power. Here, the fourth surface S14 functions as a reflection surface and a refraction surface. Specifically, the fourth surface S14 is a total reflection surface with respect to a light flux (actually, light from the fifth surface S15) reversed from the third surface S13, and is a transmission surface with respect to a light flux (actually, light from the projection lens 30) reversed from the fifth surface S15. That is, the fourth surface S14 has both a function of bending the optical path and a function relating to convergence of a light flux. The projection lens 30 includes a first lens 31 having positive refractive power, a second lens 32 having negative refractive power, and a third lens 33 having positive refractive power. A specific specification of the optical system of Example 3 is as follows. A horizontal viewing angle is 20.1 degrees, a vertical viewing angle is 11.4 degrees, the size of a display area of the video display element is 9.22*5.18 mm, a pupil diameter is 5 mm, and a focal distance is about 26 mm.

Figure 6:
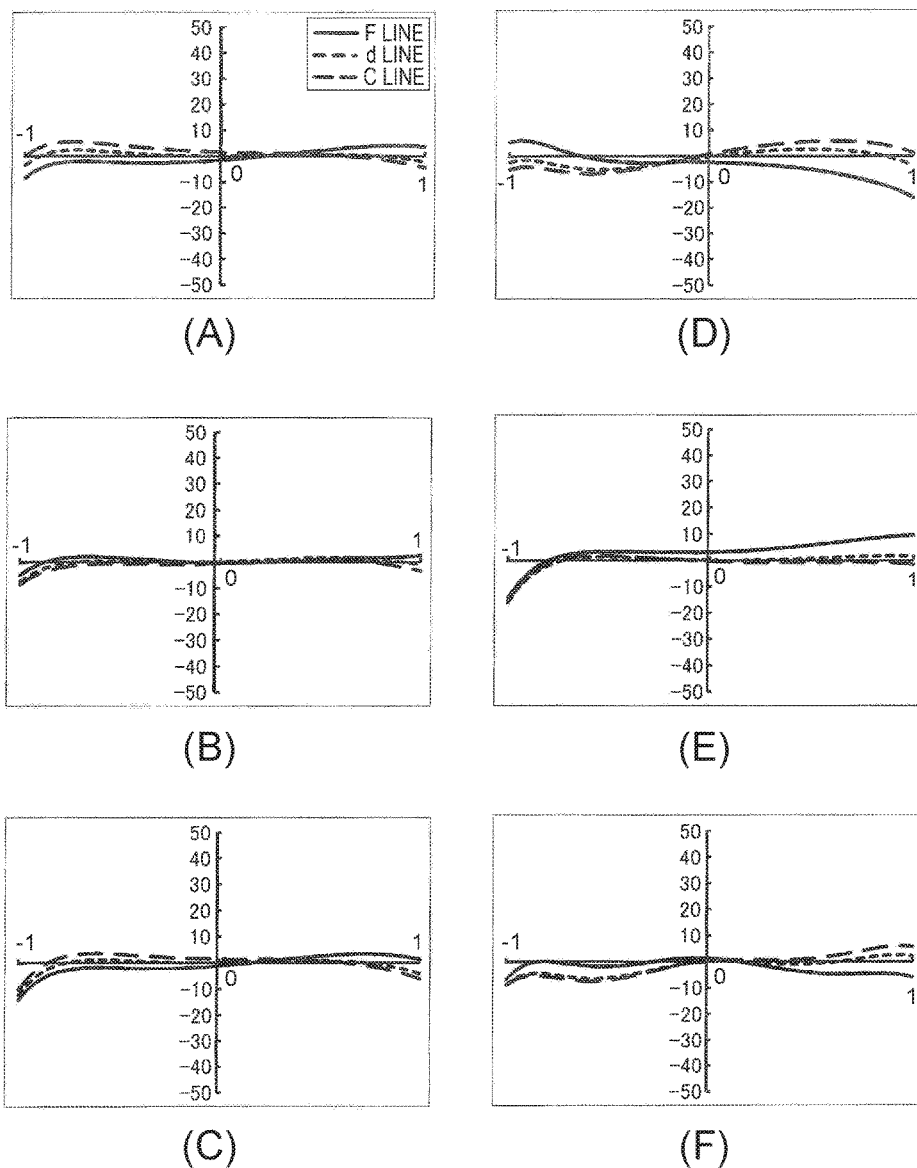
FIG. 6

FIGS. 6 and 7 show aberration of Example 1. In each aberration diagram, the horizontal axis represents a position in a pupil, and the vertical axis represents the amount of aberration in units of micron. Specifically, (A) and (B) in FIG. 6 show aberration in the Y and X directions at an azimuth of 10 degrees in the X direction and 5.7 degrees in the Y direction, (C) and (D) in FIG. 6 show aberration in the Y and X directions at an azimuth of 0.0 degree in the X direction and 5.7 degrees in the Y direction, and (E) and (F) in FIG. 6 show aberration in the Y and X directions at an azimuth of −10 degrees in the X direction and 5.7 degrees in the Y direction. (A) and (B) in FIG. 7 show aberration in the Y and X directions at an azimuth of 10 degrees in the X direction and 0.0 degree in the Y direction, (C) and (D) in FIG. 7 show aberration in the Y and X directions at an azimuth of 0.0 degree in the X direction and 0.0 degree in the Y direction, and (E) and (F) in FIG. 7 show aberration in the Y and X directions at an azimuth of −10 degrees in the X direction and 0.0 degree in the Y direction. The amount of aberration shown in the drawing represents the amount of aberration on the image surface of the video display element when a light beam is reversed for convenience.

Example 2

In a projection see-through device of Example 2, data on an optical surface constituting a light guide member and a projection lens is shown in Table 5.

In a projection see-through device of Example 2, data on an optical surface constituting a light guide member and a projection lens (projection optical system) is shown in Table 5. FFS7 means the lens surface 31a which is the emission surface of the first lens of the projection lens. ASP1 means the incidence surface of the first lens of the projection lens, not the emission surface, and ASP2 means the emission surface of the second lens.

TABLE 5

| No | Type          | R       | T      | Nd    | Vd    |
| -- | ------------- | ------- | ------ | ----- | ----- |
| 1  | SPH           | ∞       | 20.00  |       |       |
| 2  | FFS1          | —       | 4.80   | 1.525 | 55.95 |
| 3  | FFS2          | —       | −4.80  | 1.525 | 55.95 |
| 4  | FFS1          | —       | 8.00   | 1.525 | 55.95 |
| 5  | FFS3          | —       | −14.20 | 1.525 | 55.95 |
| 6  | FFS4          | —       | 8.70   | 1.525 | 55.95 |
| 7  | FFS5          | —       | −7.00  | 1.525 | 55.95 |
| 8  | FFS6          | —       | −2.00  |       |       |
| 9  | FFS7          | —       | −3.00  | 1.525 | 55.95 |
| 10 | ASP1          | 3.231   | −1.50  |       |       |
| 11 | ASP2          | 2.180   | −1.50  | 1.585 | 29.90 |
| 12 | ASP3          | 4.010   | −7.18  |       |       |
| 13 | ASP4          | −6.744  | −5.00  | 1.525 | 55.95 |
| 14 | ASP5          | −13.372 | −3.00  |       |       |
| 15 | SPH           | ∞       | −1.44  | 1.458 | 67.82 |
| 16 | image surface | ∞       |        |       |       |

In regards to the optical surface in the light guide member constituting Example 2, the optical axis inclination angle (tilt) TLY on the cross section and the optical axis deviation (decenter) DCX are shown in Table 6.

TABLE 6

| No | Type | TLY (before surface) | DCX (after surface) | TLY (after surface) |
| -- | ---- | -------------------- | ------------------- | ------------------- |
| 2  | FFS1 | 0.00                 | 0.0                 | 0.00                |
| 3  | FFS2 | −23.00               | 0.0                 | 23.00               |
| 4  | FFS1 | 0.00                 | 0.0                 | 0.00                |
| 5  | FFS3 | 0.00                 | 16.335              | 1.08                |

TABLE 6-continued

| No | Type | TLY (before surface) | DCX (after surface) | TLY (after surface) |
|----|------|----------------------|---------------------|---------------------|
| 6  | FFS4 | 38.00                | 0.0                 | 38.00               |
| 7  | FFS5 | −39.00               | 0.0                 | −39.00              |
| 8  | FFS6 | 0.00                 | 0.0                 | 0.00                |

In regards to each optical surface in the light guide member constituting Example 2, the coefficient $Ak_{m,n}$ expanded as a polynomial of a free-form surface (including a flat surface) and the coefficient $A_{m,n}$ expanded as a polynomial of a non-axisymmetric aspheric surface among the optical surfaces in the projection lens are shown in Table 7. In Table 7, symbols m and n means variables or degrees in the coefficients $Ak_{m,n}$ and $A_{m,n}$. A symbol FFSk (where k=1 to 6) means a k-th surface among the first to sixth surfaces S11 to S16 which are free-form surfaces. A symbol FFSk (where k=7) means the lens surface 31a which is a non-axisymmetric aspheric surface. The coefficient $Ak_{m,n}$ means a coefficient of each term $x^m*y^n$ which constitutes a polynomial expression representing the k-th surface. The coefficient $A_{m,n}$ means a coefficient of each term $x^m*y^n$ which constitutes a polynomial representing a target non-axisymmetric aspheric surface. As shown in FIG. 8, in this example, it is assumed that the light guide member 10 has the sixth surface S16 which is adjacent to the fourth surface S14. As shown in the drawing, the sixth surface S16 is a light incidence surface, and has a function relating to convergence of a light flux. The fourth surface S14 has a function of bending the optical path. That is, in Example 2, the functions in the fourth surface S14 of Example 1 are separated to the fourth surface S14 and the sixth surface S16.

TABLE 7

| m | n | FFS1       | FFS2       | FFS3       | FFS4       |
|---|---|------------|------------|------------|------------|
| 2 | 0 | −2.087E−02 | −2.217E−02 | −1.889E−02 | −5.271E−04 |
| 0 | 2 | −2.253E−02 | −1.413E−02 | −1.983E−02 | −5.660E−03 |
| 3 | 0 | −3.128E−05 | 1.325E−04  | −3.066E−05 | 6.522E−04  |
| 1 | 2 | 2.416E−05  | −3.101E−04 | 2.368E−05  | 1.073E−03  |
| 4 | 0 | −1.463E−05 | −2.795E−05 | −1.404E−05 | −1.259E−05 |
| 2 | 2 | −8.004E−05 | −2.797E−06 | −7.684E−05 | 6.765E−05  |
| 0 | 4 | −5.960E−05 | −1.418E−05 | −5.721E−05 | 6.021E−05  |
| 5 | 0 | 7.707E−07  | 4.902E−07  | 7.399E−07  | 2.369E−06  |
| 3 | 2 | 6.434E−06  | −6.086E−07 | 6.177E−06  | −7.006E−06 |
| 1 | 4 | 6.430E−06  | 1.301E−06  | 6.173E−06  | −3.895E−07 |
| 6 | 0 | −2.246E−08 | −4.173E−10 | −2.156E−08 | −1.508E−07 |
| 4 | 2 | −1.775E−07 | −6.941E−08 | −1.704E−07 | −7.278E−07 |
| 2 | 4 | −3.077E−07 | −1.334E−07 | −2.210E−07 | −8.045E−07 |
| 0 | 6 | 2.556E−08  | 2.134E−08  | 2.454E−08  | −1.071E−07 |

| m | n | FFS5       | FFS6       | FFS7       |
|---|---|------------|------------|------------|
| 2 | 0 | −9.898E−03 | 8.920E−02  | 1.131E−01  |
| 0 | 2 | −2.488E−03 | 1.033E−01  | −6.695E−03 |
| 3 | 0 | 7.191E−04  | −2.279E−03 | −4.954E−03 |
| 1 | 2 | 8.687E−04  | −2.271E−03 | −8.529E−03 |
| 4 | 0 | 1.248E−04  | 4.906E−04  | 1.521E−03  |
| 2 | 2 | 1.784E−04  | −5.204E−03 | −7.179E−03 |
| 0 | 4 | −1.267E−04 | −2.717E−03 | −2.333E−03 |
| 5 | 0 | 1.525E−05  | 6.674E−05  | −2.139E−04 |
| 3 | 2 | 1.351E−05  | 1.156E−04  | 4.242E−04  |
| 1 | 4 | 7.544E−05  | 2.352E−04  | 4.229E−04  |
| 6 | 0 | 2.467E−06  | −5.455E−06 | −1.641E−04 |
| 4 | 2 | 4.101E−06  | 2.470E−05  | 1.539E−04  |
| 2 | 4 | −7.037E−07 | 1.143E−04  | 2.931E−04  |
| 0 | 6 | 1.333E−06  | 5.102E−05  | 8.227E−05  |

Coefficients of an aspheric surface of the optical surface (an axisymmetric aspheric surface which is a surface other than the lens surface 31a as the non-axisymmetric aspheric surface) constituting the projection lens in the projection see-through device of Example 2 are shown in Table 8.

TABLE 8

|    | ASP1       | ASP2       | ASP3       | ASP4       | ASP5       |
|----|------------|------------|------------|------------|------------|
| K  | −1         | −1         | −1         | −1         | −1         |
| B4 | −3.695E−03 | −1.468E−02 | −5.329E−03 | 4.441E−04  | 5.162E−04  |
| B6 | 6.588E−05  | 4.317E−04  | −3.605E−05 | −9.791E−06 | −2.708E−07 |
| B8 | 4.147E−08  | −3.867E−06 | 4.261E−06  | −5.194E−08 | −4.521E−07 |

In Table 8, symbols K and Bi represent coefficients for specifying aspheric surfaces with the symbols ASP1 to ASP5 which are lens surfaces other than the lens surface 31a among the three lenses 31, 32, 33 constituting the projection lens 30.

FIG. 8 is a sectional view of the projection see-through device of Example 2. FIG. 9 is a diagram showing the local coordinate in the light guide member. In the projection see-through device 70, the light guide member 10 includes the first surface S11 having weak negative refractive power, the second surface S12 having comparatively strong positive refractive power, the third surface S13 having comparatively weak positive refractive power, the fourth surface S14 having comparatively weak negative refractive power, the fifth surface S15 having comparatively weak positive refractive power, and the sixth surface S16 having comparatively strong positive refractive power. The projection lens 30 includes the first lens 31 having positive refractive power, the second lens 32 having negative refractive power, and the third lens 33 having positive refractive power. A specific specification of the optical system of Example 2 is as follows. A horizontal viewing angle is 20.1 degrees, a vertical viewing angle is 11.4 degrees, the size of a display area of the video display element is 9.22*5.18 mm, a pupil diameter is 5 mm, and a focal distance is about 26 mm.

Figure 10:
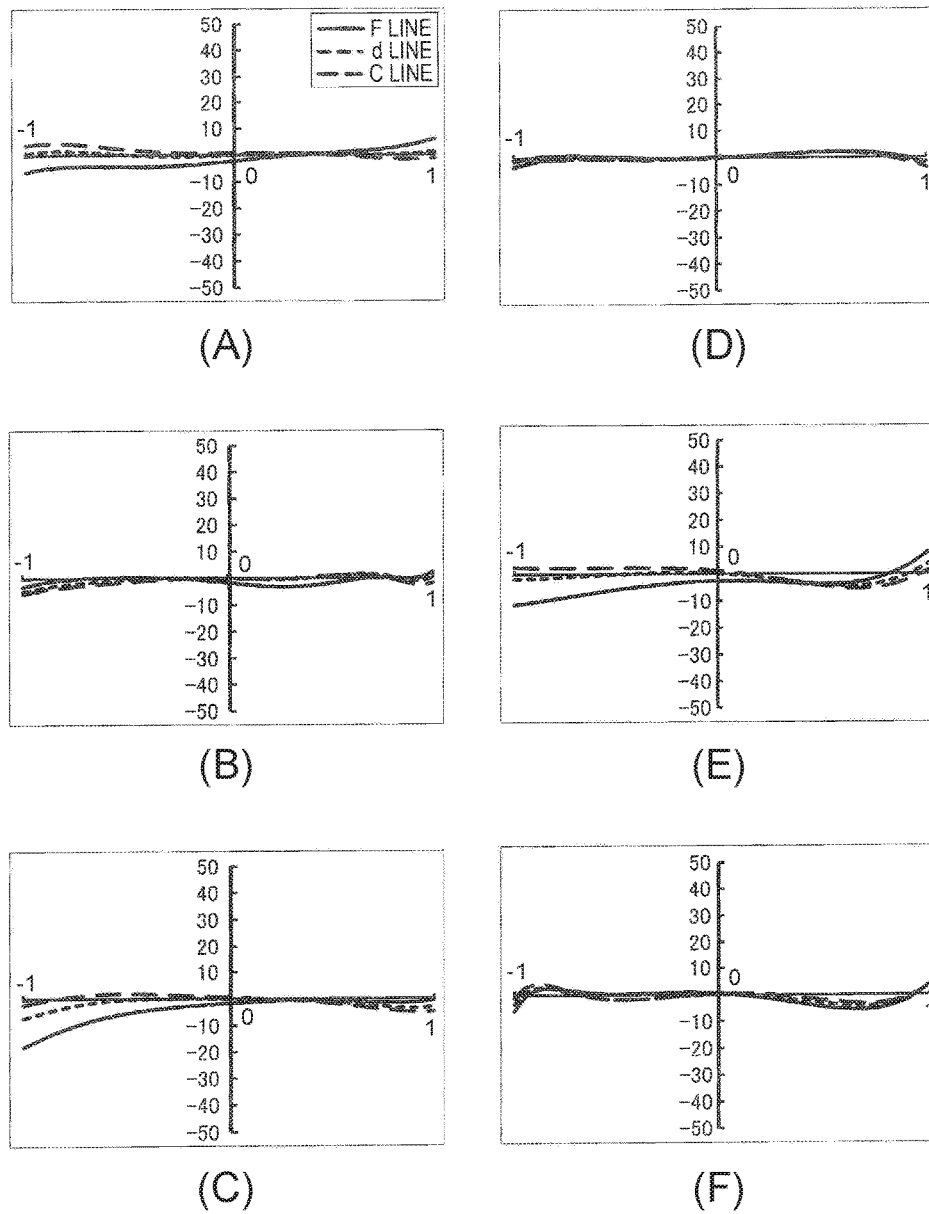
Figure 11:
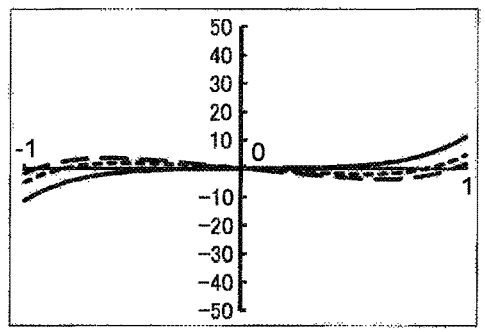
Figure 11:
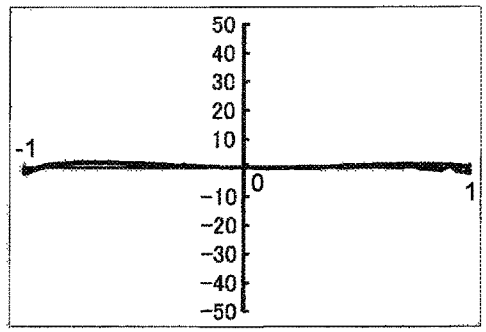
Figure 11:
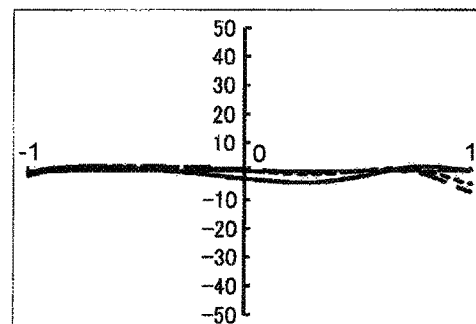
Figure 11:
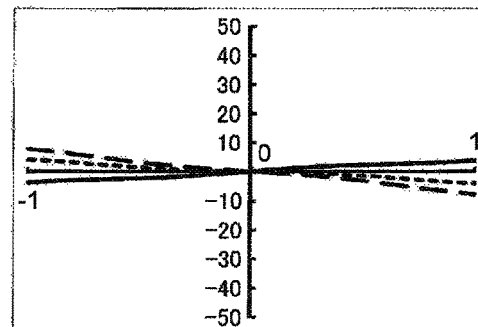
Figure 11:
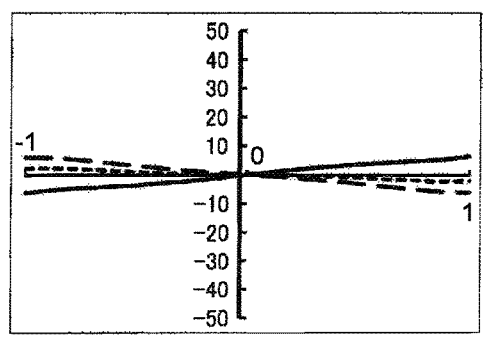
Figure 11:
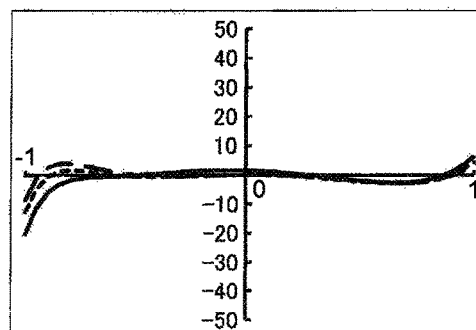

FIGS. 10 and 11 show aberration of Example 2. In each aberration diagram, the horizontal axis represents a position in a pupil, and the vertical axis represents the amount of aberration in units of micron. Specifically, (A) and (B) in FIG. 10 show aberration in the Y and X directions at an azimuth of 10 degree in the X direction and 5.7 degrees in the Y direction, (C) and (D) in FIG. 10 show aberration in the Y and X directions at an azimuth of 0.0 degree in the X direction and 5.7 degree in the Y direction, and (E) and (F) in FIG. 10 show aberration in the Y and X directions at an azimuth of −10 degrees in the X direction and 5.7 degrees in the Y direction. (A) and (B) in FIG. 11 show aberration in the Y and X directions at an azimuth of 10 degrees in the X direction and 0.0 degree in the Y direction, (C) and (D) in FIG. 11 show aberration in the Y and X directions at an azimuth of 0.0 degree in the X direction and 0.0 degrees in the Y direction, and (E) and (F) in FIG. 11 show aberration in the Y and X directions at an azimuth of −10 degrees in the X direction and 0.0 degree in the Y direction. The amount of aberration shown in the drawing represents the amount of aberration on the image surface of the video display element when a light beam is reversed for convenience.

Example 3

In a projection see-through device of Example 3, data on an optical surface constituting a light guide member and a projection lens (projection optical system) is shown in Table 9. As shown in FIG. 12, in Example 3, the lens surface 32b which is the incidence surface of the second lens 32, not the first lens 31, in the projection lens 30 is a non-axisymmetric aspheric surface, and FFS6 means the lens surface 32b. For example, while ASP1 means the incidence surface of the first lens of the projection lens and ASP2 means the incidence surface of the first lens, ASP4 means the emission surface of the third lens, not the incidence surface of the second lens.

TABLE 9

| No | Type | R | T | Nd | Vd |
|---|---|---|---|---|---|
| 1 | SPH | ∞ | 20.00 | | |
| 2 | FFS1 | — | 5.50 | 1.525 | 55.95 |
| 3 | FFS2 | — | −5.50 | 1.525 | 55.95 |
| 4 | FFS1 | — | 9.00 | 1.525 | 55.95 |
| 5 | FFS3 | — | −14.50 | 1.525 | 55.95 |
| 6 | FFS4 | — | 9.50 | 1.525 | 55.95 |
| 7 | FFS5 | — | −9.50 | 1.525 | 55.95 |
| 8 | FFS4 | — | −2.00 | | |
| 9 | ASP1 | −7.938 | −5.00 | 1.525 | 55.95 |
| 10 | ASP2 | 6.561 | −1.00 | | |
| 11 | ASP3 | 4.480 | −1.50 | 1.585 | 29.90 |
| 12 | FFS6 | — | −6.10 | | |
| 13 | ASP4 | −9.941 | −6.00 | 1.525 | 55.95 |
| 14 | ASP5 | 29.300 | −5.00 | | |
| 15 | SPH | ∞ | −1.44 | 1.458 | 67.82 |
| 16 | image surface | ∞ | | | |

In regards to the optical surface in the light guide member constituting Example 3, the optical axis inclination angle (tilt) TLY on the cross section and the optical axis deviation (decenter) DCX are shown in Table 10.

TABLE 10

| No | Type | TLY (before surface) | DCX (after surface) | TLY (after surface) |
|---|---|---|---|---|
| 2 | FFS1 | 0.00 | 0.0 | 0.00 |
| 3 | FFS2 | −25.00 | 0.0 | 25.00 |
| 4 | FFS1 | 0.00 | 0.0 | 0.00 |
| 5 | FFS3 | 0.00 | 17.062 | −38.15 |
| 6 | FFS4 | 43.00 | 0.0 | 43.00 |
| 7 | FFS5 | −27.00 | 0.0 | 27.00 |
| 8 | FFS6 | −43.00 | 7.8 | −11.16 |

In regards to each optical surface in the light guide member constituting Example 3, the coefficient $Ak_{m,n}$ expanded as a polynomial of a free-form surface (including a flat surface) and the coefficient $A_{m,n}$ expanded as a polynomial of a non-axisymmetric aspheric surface among the optical surfaces in the projection lens are shown in Table 11. In Table 11, symbols m and n means variables or degrees in the coefficients $Ak_{m,n}$ and $A_{m,n}$. A symbol FFSk (where k=1 to 5) means a k-th surface among the first to fifth surfaces S11 to S15 which are free-form surfaces. A symbol FFSk (where k=6) means the lens surface 32b which is a non-axisymmetric aspheric surface. The coefficient $Ak_{m,n}$ means a coefficient of each term $x^m * y^n$ which constitutes a polynomial expression representing the k-th surface. The coefficient $A_{m,n}$ means a coefficient of each term $x^m * y^n$ which constitutes a polynomial representing a target non-axisymmetric aspheric surface. As shown in FIG. 12, in this example, similarly to the fourth surface S14 of Example 1, the fourth surface S14 has both a function of bending the optical path and a function relating to convergence of a light flux.

TABLE 11

| m | n | FFS1 | FFS2 | FFS3 | FFS4 | FFS5 | FFS6 |
|---|---|---|---|---|---|---|---|
| 2 | 0 | −2.432E−03 | −1.211E−02 | −2.396E−03 | 9.362E−03 | −4.205E−04 | 9.362E−03 |
| 0 | 2 | −1.191E−02 | −1.352E−02 | −1.107E−02 | −3.922E−02 | −2.189E−02 | −3.922E−02 |
| 3 | 0 | −4.162E−05 | −5.153E−05 | −4.079E−05 | 7.027E−05 | 8.198E−04 | 7.027E−05 |
| 1 | 2 | −3.236E−04 | −1.411E−04 | −3.171E−04 | 7.812E−04 | 1.073E−04 | 7.812E−04 |
| 4 | 0 | −2.430E−06 | −8.555E−06 | −3.527E−06 | −9.925E−06 | 6.847E−05 | −9.925E−06 |
| 2 | 2 | 1.154E−05 | 2.515E−06 | 1.593E−05 | 2.977E−05 | −8.528E−06 | 2.977E−05 |
| 0 | 4 | −1.674E−06 | −2.515E−06 | −1.040E−06 | 5.632E−05 | 9.899E−06 | 5.632E−05 |
| 5 | 0 | 3.302E−07 | 2.078E−07 | 2.238E−07 | −2.036E−07 | 3.776E−06 | −2.036E−07 |
| 3 | 2 | −5.857E−07 | −8.864E−07 | −3.808E−08 | −2.456E−06 | 8.910E−08 | −2.456E−06 |
| 1 | 4 | 9.253E−07 | 2.819E−07 | 9.277E−07 | −7.538E−06 | 2.080E−06 | −7.538E−06 |
| 6 | 0 | −1.940E−08 | 5.557E−08 | −4.744E−09 | 3.281E−07 | −1.468E−06 | 3.281E−07 |
| 4 | 2 | −2.251E−08 | 3.002E−08 | −7.243E−09 | 4.453E−07 | 8.741E−07 | 4.453E−07 |
| 2 | 4 | 2.381E−08 | −3.144E−08 | 1.715E−08 | 1.547E−06 | 8.344E−07 | 1.547E−06 |
| 0 | 6 | 6.807E−08 | 4.935E−09 | 5.801E−08 | −1.205E−06 | −1.213E−07 | −1.205E−06 |

Coefficients of an aspheric surface of the optical surface (an axisymmetric aspheric surface which is a surface other than the lens surface 32b as the non-axisymmetric aspheric surface) constituting the projection lens in the projection see-through device of Example 3 are shown in Table 12.

TABLE 12

|    | ASP1       | ASP2       | ASP3       | ASP4       | ASP5       |
|----|------------|------------|------------|------------|------------|
| K  | −1         | −1         | −1         | −1         | −1         |
| B4 | −3.442E−05 | −7.013E−04 | −3.033E−03 | 2.725E−04  | 1.527E−04  |
| B6 | 4.303E−06  | 4.776E−06  | 4.783E−05  | −4.820E−06 | −1.326E−06 |
| B8 | 1.304E−07  | 5.366E−08  | −5.817E−07 | 7.555E−08  | 4.036E−08  |

In Table 12, symbols K and Bi represent coefficients for specifying aspheric surfaces with the symbols ASP1 to ASP5 which are lens surfaces other than the lens surface 32b among the three lenses 31, 32, 33 constituting the projection lens 30.

FIG. 12 is a sectional view of the projection see-through device 70 of Example 3. FIG. 13 is a diagram showing the local coordinate in the light guide member. In the projection see-through device 70, the light guide member 10 includes the first surface S11 having weak negative refractive power, the second surface S12 having comparatively strong positive refractive power, the third surface S13 having comparatively weak positive refractive power, the fourth surface S14 having comparatively weak negative refractive power, the fifth surface S15 having comparatively weak positive refractive power, and the sixth surface S16 having comparatively strong positive refractive power. The projection lens 30 includes the first lens 31 having positive refractive power, the second lens 32 having negative refractive power, and the third lens 33 having positive refractive power. A specific specification of the optical system of Example 4 is as follows. A horizontal viewing angle is 20.1 degrees, a vertical viewing angle is 11.4 degrees, the size of a display area of the video display element is 9.22*5.18 mm, a pupil diameter is 5 mm, and a focal distance is about 26 mm.

Figure 14:
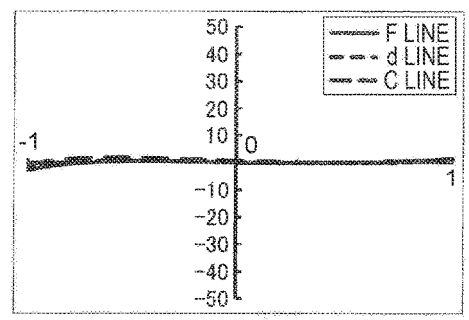
Figure 14:
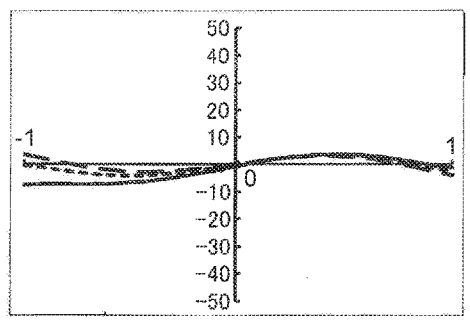
Figure 14:
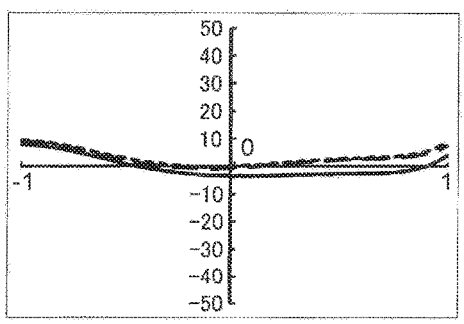
Figure 14:
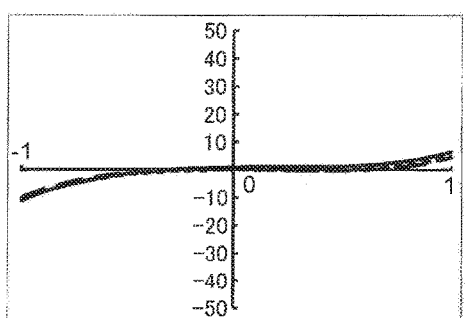
Figure 14:
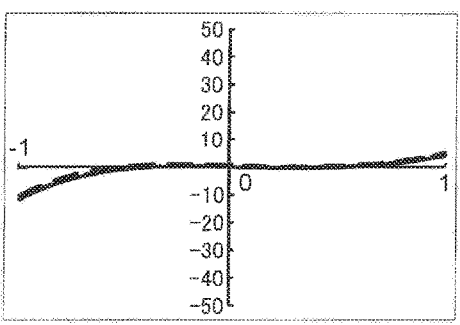
Figure 14:
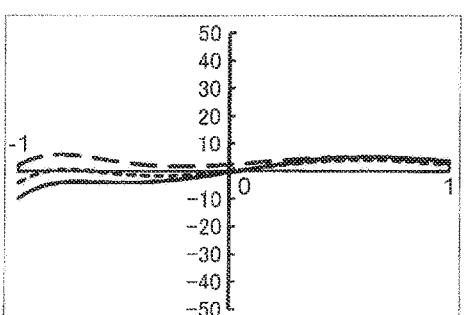
Figure 15:
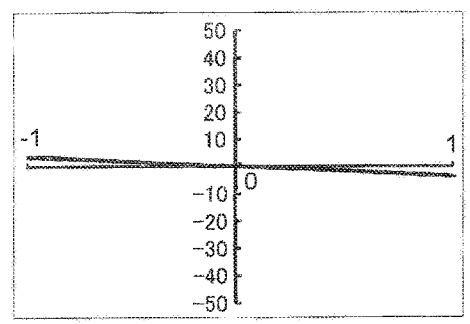
Figure 15:
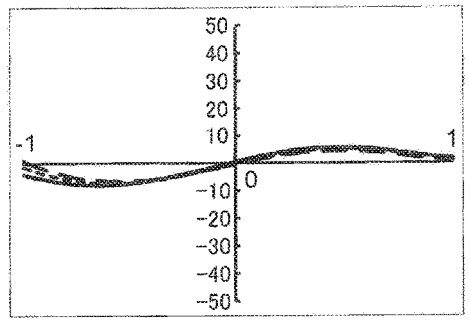
Figure 15:
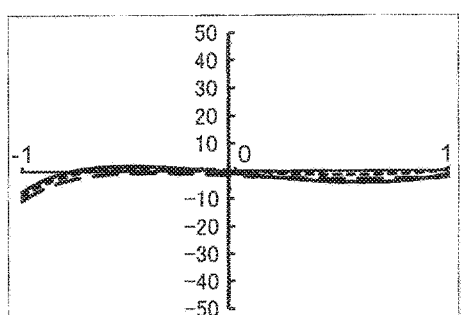
Figure 15:
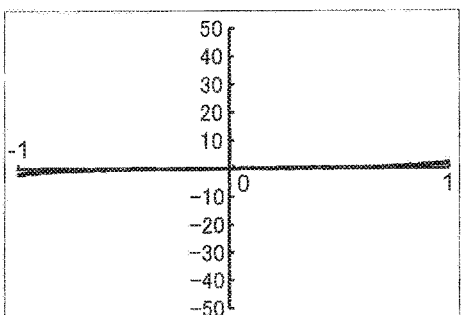
Figure 15:
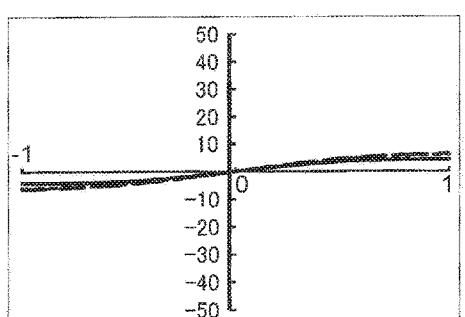
Figure 15:
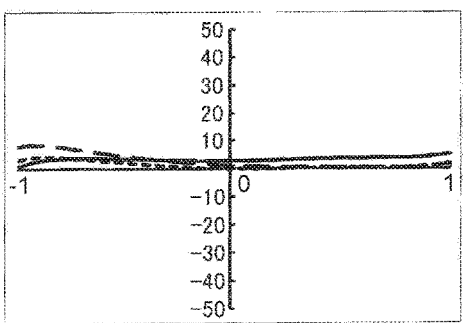

FIGS. 14 and 15 show aberration of Example 3. In each aberration diagram, the horizontal axis represents a position in a pupil, and the vertical axis represents the amount of aberration in units of micron. Specifically, (A) and (B) in FIG. 14 show aberration in the Y and X directions at an azimuth of 10 degrees in the X direction and 5.7 degrees in the Y direction, (C) and (D) in FIG. 14 show aberration in the Y and X directions at an azimuth of 0.0 degree in the X direction and 5.7 degrees in the Y direction, and (E) and (F) in FIG. 14 show aberration in the Y and X directions at an azimuth of −10 degrees in the X direction and 5.7 degrees in the Y direction. (A) and (B) in FIG. 15 show aberration in the Y and X directions at an azimuth of 10 degrees in the X direction and 0.0 degree in the Y direction, (C) and (D) in FIG. 15 show aberration in the Y and X directions at an azimuth of 0.0 degree in the X direction and 0.0 degree in the Y direction, and (E) and (F) in FIG. 15 show aberration in the Y and X directions at an azimuth of −10 degrees in the X direction and 0.0 degrees in the Y direction. The amount of aberration shown in the drawing represents the amount of aberration on the image surface of the video display element when a light beam is reversed for convenience.

Example 4

In a projection see-through device of Example 4, data on an optical surface constituting a light guide member and a projection lens (projection optical system) is shown in Table 13. As shown in FIG. 16, in Example 4, the lens surface 32b which is the incidence surface of the second lens 32, not the first lens 31, in the projection lens 30 is a non-axisymmetric aspheric surface, and FFS7 means the lens surface 32b. For example, while ASP1 means the incidence surface of the first lens of the projection lens and ASP2 means the incidence surface of the first lens, ASP4 means the emission surface of the third lens, not the incidence surface of the second lens.

TABLE 13

| No | Type | R | T | Nd | Vd |
|----|------|---|---|----|----|
| 1  | SPH  | ∞ | 20.00 | | |
| 2  | FFS1 | — | 5.00 | 1.525 | 55.95 |
| 3  | FFS2 | — | −5.00 | 1.525 | 55.95 |
| 4  | FFS1 | — | 8.50 | 1.525 | 55.95 |
| 5  | FFS3 | — | −12.00 | 1.525 | 55.95 |
| 6  | FFS4 | — | 10.00 | 1.525 | 55.95 |
| 7  | FFS5 | — | −5.00 | 1.525 | 55.95 |
| 8  | FFS6 | — | −2.00 | | |
| 9  | ASP1 | −13.257 | −5.00 | 1.525 | 55.95 |
| 10 | ASP2 | 11.003 | −1.50 | | |
| 11 | ASP3 | 9.685 | −1.50 | 1.585 | 29.90 |
| 12 | FFS7 | — | −3.74 | | |
| 13 | ASP4 | −23.893 | −4.50 | 1.525 | 55.95 |
| 14 | ASP5 | 37.465 | −2.00 | | |
| 15 | SPH | ∞ | −1.44 | 1.458 | 67.82 |
| 16 | image surface | ∞ | | | |

In regards to the optical surface in the light guide member constituting Example 4, the optical axis inclination angle (tilt) TLY on the cross section and the optical axis deviation (decenter) DCX are shown in Table 14.

TABLE 14

| No | Type | TLY (before surface) | DCX (after surface) | TLY (after surface) |
|----|------|---------------------|--------------------|--------------------|
| 2 | FFS1 | 0.00 | 0.0 | 0.00 |
| 3 | FFS2 | −24.00 | 0.0 | 24.00 |
| 4 | FFS1 | 0.00 | 0.0 | 0.00 |
| 5 | FFS3 | 0.00 | 14.621 | −21.30 |
| 6 | FFS4 | 40.00 | 0.0 | 40.00 |
| 7 | FFS5 | −35.00 | 0.0 | −35.00 |
| 8 | FFS6 | 0.00 | 0.0 | 0.00 |

In regards to each optical surface in the light guide member constituting Example 4, the coefficient $Ak_{m,n}$ expanded as a polynomial of a free-form surface (including a flat surface) and the coefficient $A_{m,n}$ expanded as a polynomial of a non-axisymmetric aspheric surface among the optical surfaces in the projection lens are shown in Table 15. In Table 15, symbols m and n means variables or degrees in the coefficients $Ak_{m,n}$ and $A_{m,n}$. A symbol FFSk (where k=1 to 6) means a k-th surface among the first to sixth surfaces S11 to S16 which are free-form surfaces. A symbol FFSk (where k=7) means the lens surface 32b which is a non-axisymmetric aspheric surface. The coefficient $Ak_{m,n}$ means a coefficient of each term $x^m*y^n$ which constitutes a polynomial expression representing the k-th surface. The coefficient $A_{m,n}$ means a coefficient of each term $x^m*y^n$ which constitutes a polynomial representing a target non-axisymmetric aspheric surface. As shown in FIG. 16, in this example, it is assumed that the light guide member 10 has the sixth surface S16 which is continuously adjacent to the fourth surface S14. As shown in the drawing, the sixth surface S16 is a light incidence surface, and has a function relating to convergence of a light flux. The fourth surface S14 has a function of bending the optical path. That is, in Example 4, the functions in the fourth surface S14 of Example 1 are separated to the fourth surface S14 and the sixth surface S16.

TABLE 15

| m | n | FFS1 | FFS2 | FFS3 | FFS4 |
|---|---|------|------|------|------|
| 2 | 0 | −5.276E−03 | −1.333E−02 | −4.960E−03 | 8.629E−03 |
| 0 | 2 | −3.830E−02 | −1.893E−02 | −3.102E−02 | −2.954E−02 |
| 3 | 0 | −3.115E−05 | 1.010E−04 | −3.052E−05 | −1.682E−04 |
| 1 | 2 | 3.637E−04 | −1.366E−04 | 3.564E−04 | −3.434E−04 |
| 4 | 0 | 1.040E−05 | −1.271E−05 | −1.497E−05 | −1.918E−05 |
| 2 | 2 | −5.747E−05 | −2.548E−05 | 1.496E−05 | −9.404E−05 |
| 0 | 4 | −9.378E−05 | −2.224E−05 | −7.281E−06 | 5.598E−04 |
| 5 | 0 | −3.207E−07 | 2.231E−07 | 2.947E−07 | 3.555E−06 |
| 3 | 2 | −6.124E−06 | 5.624E−07 | −2.746E−06 | −8.319E−06 |
| 1 | 4 | −9.769E−07 | 2.705E−07 | −6.839E−07 | 6.520E−05 |
| 6 | 0 | 1.971E−08 | −5.666E−08 | 1.948E−09 | −7.231E−07 |
| 4 | 2 | 3.069E−07 | −9.514E−08 | 4.186E−08 | −2.306E−06 |
| 2 | 4 | −4.676E−07 | −2.040E−08 | 2.419E−09 | 5.960E−06 |
| 0 | 6 | −1.539E−07 | −2.841E−08 | 2.856E−08 | 4.341E−07 |

| m | n | FFS5 | FFS6 | FFS7 |
|---|---|------|------|------|
| 2 | 0 | −1.305E−02 | −6.999E−03 | −1.424E−02 |
| 0 | 2 | −9.870E−03 | 1.195E−01 | 1.006E−01 |
| 3 | 0 | 2.667E−04 | −1.243E−03 | 1.515E−04 |
| 1 | 2 | 9.797E−04 | 5.209E−03 | 1.854E−03 |
| 4 | 0 | 1.680E−05 | −7.118E−04 | −6.702E−04 |
| 2 | 2 | −8.006E−06 | −9.784E−04 | −5.917E−04 |
| 0 | 4 | −1.386E−04 | −5.956E−04 | 1.617E−04 |
| 5 | 0 | 1.766E−06 | 3.291E−05 | 2.290E−05 |
| 3 | 2 | −1.365E−05 | −8.577E−05 | −2.469E−05 |
| 1 | 4 | 3.113E−05 | 1.002E−04 | 4.318E−05 |
| 6 | 0 | 2.047E−07 | 1.330E−05 | −2.366E−05 |
| 4 | 2 | −7.232E−07 | 2.387E−05 | −1.064E−05 |
| 2 | 4 | 2.287E−06 | 2.140E−05 | −7.976E−05 |
| 0 | 6 | 2.204E−05 | 6.819E−05 | −2.417E−04 |

Coefficients of an aspheric surface of the optical surface (an axisymmetric aspheric surface which is a surface other than the lens surface 32b as the non-axisymmetric aspheric surface) constituting the projection lens in the projection see-through device of Example 4 are shown in Table 16.

TABLE 16

|  | ASP1 | ASP2 | ASP3 | ASP4 | ASP5 |
|---|------|------|------|------|------|
| K | −1 | −1 | −1 | −1 | −1 |
| B4 | −8.633E−04 | −7.665E−04 | −5.112E−04 | 4.730E−04 | 7.382E−04 |
| B6 | 9.916E−06 | 1.262E−05 | 9.679E−06 | −1.612E−05 | −1.427E−05 |
| B8 | −8.725E−08 | −1.747E−07 | −2.486E−07 | 3.137E−07 | 2.753E−07 |

In Table 16, symbols K and Bi represent coefficients for specifying aspheric surfaces with the symbols ASP1 to ASP5 which are lens surfaces other than the lens surface 32b among the three lenses 31, 32, 33 constituting the projection lens 30.

FIG. 16 is a sectional view of the projection see-through device 70 of Example 4. FIG. 17 is a diagram showing the local coordinate in the light guide member. In the projection see-through device 70, the light guide member 10 includes the first surface S11 having weak negative refractive power, the second surface S12 having comparatively strong positive refractive power, the third surface S13 having comparatively weak positive refractive power, the fourth surface S14 having comparatively weak negative refractive power, the fifth surface S15 having comparatively weak positive refractive power, and the sixth surface S16 having comparatively strong positive refractive power. The projection lens 30 includes the first lens 31 having positive refractive power, the second lens 32 having negative refractive power, and the third lens 33 having positive refractive power. A specific specification of the optical system of Example 4 is as follows. A horizontal viewing angle is 20.1 degrees, a vertical viewing angle is 11.4 degrees, the size of a display area of the video display element is 9.22*5.18 mm, a pupil diameter is 5 mm, and a focal distance is about 26 mm.

Figure 18:
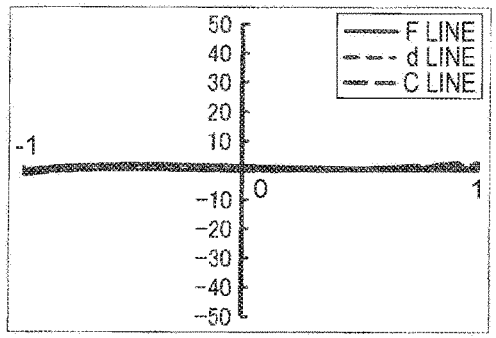
Figure 18:
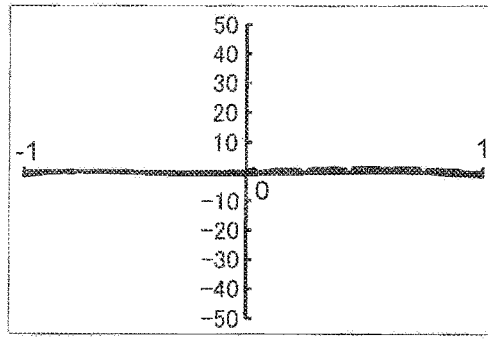
Figure 18:
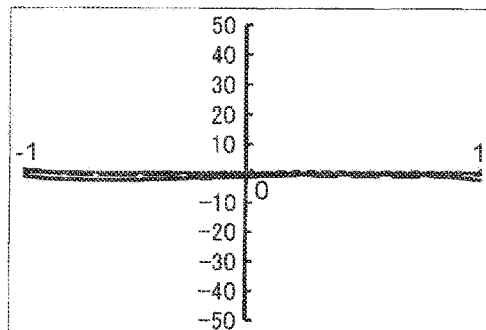
Figure 18:
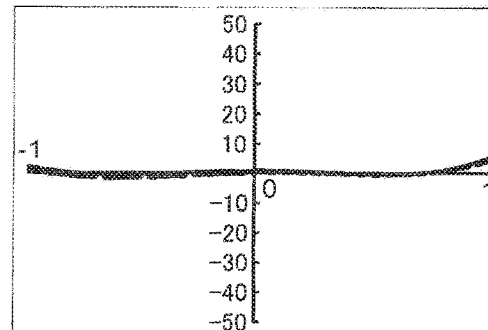
Figure 18:
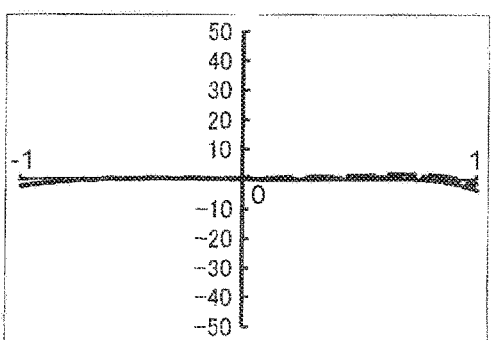
Figure 18:
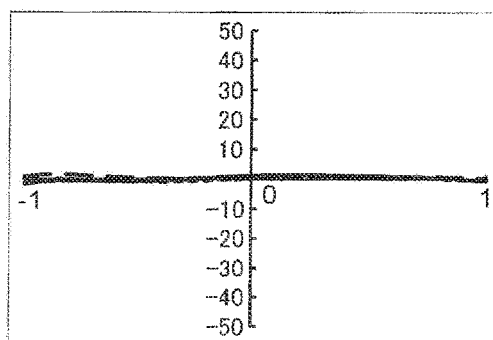
Figure 19:
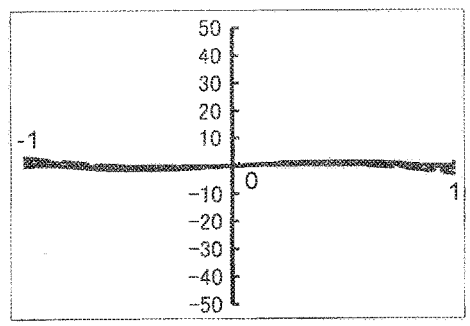
Figure 19:
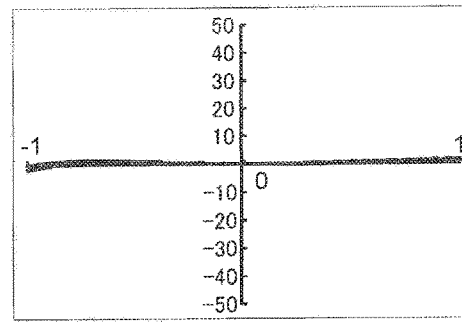
Figure 19:
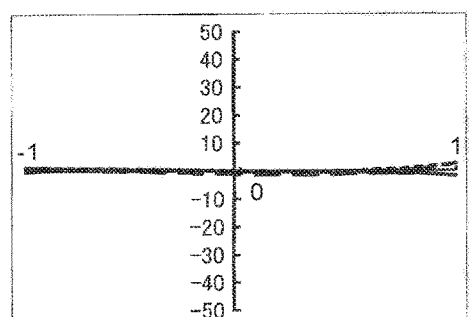
Figure 19:
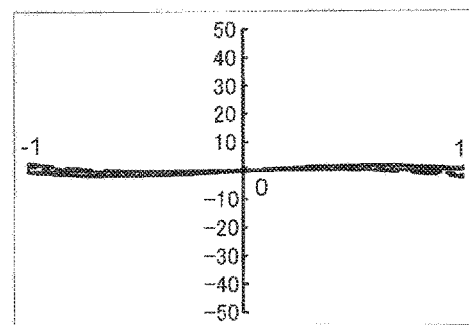
Figure 19:
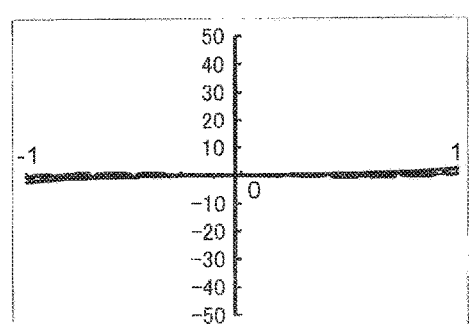
Figure 19:
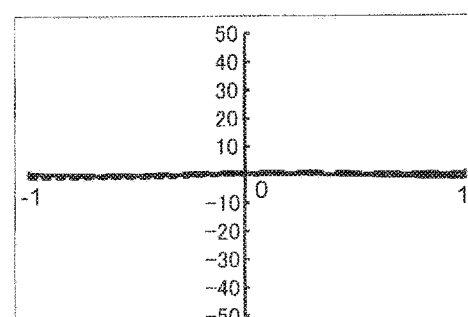

FIGS. 18 and 19 show aberration of Example 4. In each aberration diagram, the horizontal axis represents a position in a pupil, and the vertical axis represents the amount of aberration in units of micron. Specifically, (A) and (B) in FIG. 18 show aberration in the Y and X directions at an azimuth of 10 degrees in the X direction and 5.7 degrees in the Y direction, (C) and (D) in FIG. 18 show aberration in the Y and X directions at an azimuth of 0.0 degree in the X direction and 5.7 degrees in the Y direction, and (E) and (F) in FIG. 18 show aberration in the Y and X directions at an azimuth of −10 degrees in the X direction and 5.7 degrees in the Y direction. (A) and (B) in FIG. 19 show aberration in the Y and X directions at an azimuth of 10 degrees in the X direction and 0.0 degree in the Y direction, (C) and (D) in FIG. 19 show aberration in the Y and X directions at an azimuth of 0.0 degree in the X direction and 0.0 degree in the Y direction, and (E) and (F) in FIG. 19 show aberration in the Y and X directions at an azimuth of −10 degrees in the X direction and 0.0 degrees in the Y direction. The amount of aberration shown in the drawing represents the amount of aberration on the image surface of the video display element when a light beam is reversed for convenience.

Example 5

In a projection see-through device of Example 5, data on an optical surface constituting a light guide member and a projection lens (projection optical system) is shown in Table 17. FFS7 means the lens surface 31b which is the emission surface of the first lens of the projection lens. ASP1 means the incidence surface of the first lens of the projection lens, not the emission surface, and ASP2 means the emission surface of the second lens. As shown in FIG. 20, in Example 5, the projection lens 30 has two lenses 31 and 32.

TABLE 17

| No | Type | R | T | Nd | Vd |
|----|------|---|---|-----|-----|
| 1 | SPH | ∞ | 20.00 |  |  |
| 2 | FFS1 | — | 5.00 | 1.525 | 55.95 |
| 3 | FFS2 | — | −5.00 | 1.525 | 55.95 |
| 4 | FFS1 | — | 8.50 | 1.525 | 55.95 |
| 5 | FFS3 | — | −12.00 | 1.525 | 55.95 |
| 6 | FFS4 | — | 9.00 | 1.525 | 55.95 |
| 7 | FFS5 | — | −6.20 | 1.525 | 55.95 |
| 8 | FFS6 | — | −2.00 |  |  |

TABLE 17-continued

| No | Type | R | T | Nd | Vd |
|---|---|---|---|---|---|
| 9 | ASP1 | −46.932 | −1.50 | 1.585 | 29.90 |
| 10 | FFS7 | — | −3.23 | | |
| 11 | ASP2 | −6.165 | −4.00 | 1.525 | 55.95 |
| 12 | ASP3 | −19.763 | −3.00 | | |
| 13 | SPH | ∞ | −1.44 | 1.458 | 67.82 |
| 14 | image surface | ∞ | | | |

In regards to the optical surface in the light guide member constituting Example 5, the optical axis inclination angle (tilt) TLY on the cross section and the optical axis deviation (decenter) DCX are shown in Table 18.

TABLE 18

| No | Type | TLY (before surface) | DCX (after surface) | TLY (after surface) |
|---|---|---|---|---|
| 2 | FFS1 | 0.00 | 0.0 | 0.00 |
| 3 | FFS2 | −24.00 | 0.0 | 24.00 |
| 4 | FFS1 | 0.00 | 0.0 | 0.00 |
| 5 | FFS3 | 0.00 | 15.361 | −5.87 |
| 6 | FFS4 | 35.00 | 0.0 | 35.00 |
| 7 | FFS5 | −37.00 | 0.0 | −37.00 |
| 8 | FFS6 | 0.00 | 0.0 | 0.00 |

In regards to each optical surface in the light guide member constituting Example 5, the coefficient $Ak_{m,n}$ expanded as a polynomial of a free-form surface (including a flat surface) and the coefficient $A_{m,n}$ expanded as a polynomial of a non-axisymmetric aspheric surface among the optical surfaces in the projection lens are shown in Table 19. In Table 19, symbols m and n means variables or degrees in the coefficients $Ak_{m,n}$ and $A_{m,n}$. A symbol FFSk (where k=1 to 6) means a k-th surface among the first to sixth surfaces S11 to S16 which are free-form surfaces. A symbol FFSk (where k=7) means the lens surface 31b which is a non-axisymmetric aspheric surface. The coefficient $Ak_{m,n}$ means a coefficient of each term $x^m * y^n$ which constitutes a polynomial expression representing the k-th surface. The coefficient $A_{m,n}$ means a coefficient of each term $x^m * y^n$ which constitutes a polynomial representing a target non-axisymmetric aspheric surface. As shown in FIG. 20, in this example, it is assumed that the light guide member 10 has the sixth surface S16 which is continuously adjacent to the fourth surface S14. As shown in the drawing, the sixth surface S16 is a light incidence surface, and has a function relating to convergence of a light flux. The fourth surface S14 has a function of bending the optical path. That is, in Example 5, the functions in the fourth surface S14 of Example 1 are separated to the fourth surface S14 and the sixth surface S16.

TABLE 19

| m | n | FFS1 | FFS2 | FFS3 | FFS4 |
|---|---|---|---|---|---|
| 2 | 0 | −9.590E−03 | −1.493E−02 | −9.015E−03 | 1.106E−02 |
| 0 | 2 | −3.895E−02 | −1.718E−02 | −3.174E−02 | −4.225E−02 |
| 3 | 0 | −3.944E−05 | 1.514E−04 | −3.155E−05 | −1.006E−03 |
| 1 | 2 | 7.919E−05 | −5.479E−04 | 6.335E−05 | −1.529E−03 |
| 4 | 0 | 1.802E−05 | −9.117E−06 | −1.873E−05 | 6.325E−05 |
| 2 | 2 | −1.154E−04 | −1.375E−06 | 2.347E−05 | −1.241E−04 |
| 0 | 4 | 2.027E−06 | −8.306E−06 | −3.121E−05 | 3.387E−06 |
| 5 | 0 | −1.163E−06 | 6.691E−07 | 1.423E−07 | 1.841E−05 |
| 3 | 2 | 3.615E−07 | −9.426E−07 | −3.074E−06 | 7.113E−06 |
| 1 | 4 | −8.107E−06 | −3.125E−07 | 2.872E−06 | 8.646E−05 |
| 6 | 0 | 5.687E−08 | −1.366E−08 | 6.812E−09 | −5.296E−06 |

TABLE 19-continued

| 4 | 2 | −8.370E−08 | 2.463E−08 | 1.030E−08 | −1.413E−07 |
|---|---|---|---|---|---|
| 2 | 4 | −5.216E−07 | −2.612E−08 | −2.164E−07 | 1.999E−05 |
| 0 | 6 | 4.183E−08 | −6.074E−08 | −4.753E−08 | −3.325E−06 |

| m | n | FFS5 | FFS6 | FFS7 |
|---|---|---|---|---|
| 2 | 0 | −2.012E−02 | 4.113E−03 | −4.696E−02 |
| 0 | 2 | −2.602E−02 | 1.450E−01 | 8.928E−02 |
| 3 | 0 | 1.762E−04 | −6.809E−03 | 1.596E−03 |
| 1 | 2 | 3.957E−04 | 4.988E−03 | 5.628E−03 |
| 4 | 0 | 4.907E−07 | −2.072E−04 | −1.046E−04 |
| 2 | 2 | 1.606E−05 | 7.518E−04 | −2.569E−04 |
| 0 | 4 | 1.968E−04 | −4.126E−03 | 4.836E−03 |
| 5 | 0 | 6.181E−07 | 2.409E−05 | 5.063E−05 |
| 3 | 2 | −2.044E−06 | −2.596E−05 | −2.063E−04 |
| 1 | 4 | 5.215E−06 | 2.987E−04 | −3.074E−04 |
| 6 | 0 | 8.272E−08 | −1.343E−06 | −2.780E−05 |
| 4 | 2 | −2.522E−06 | −3.140E−05 | −1.312E−04 |
| 2 | 4 | 2.747E−05 | 5.979E−05 | −4.072E−04 |
| 0 | 6 | −9.104E−05 | 4.539E−04 | −1.536E−03 |

Coefficients of an aspheric surface of the optical surface (an axisymmetric aspheric surface which is a surface other than the lens surface 31b as the non-axisymmetric aspheric surface) constituting the projection lens in the projection see-through device of Example 5 are shown in Table 20.

TABLE 20

| | ASP1 | ASP2 | ASP3 |
|---|---|---|---|
| K | −1 | −1 | −1 |
| B4 | 1.730E−05 | 3.985E−04 | 3.628E−04 |
| B6 | −4.292E−05 | −1.324E−05 | −2.023E−05 |
| B8 | 4.667E−07 | 1.089E−07 | 3.764E−07 |

In Table 20, symbols K and Bi represent coefficients for specifying aspheric surfaces with the symbols ASP1 to ASP3 which are lens surfaces excluding the lens surface 31b of the lens 31 among the two lenses 31 and 32 constituting the projection lens 30.

FIG. 20 is a sectional view of the projection see-through device 70 of Example 5. FIG. 21 is a diagram showing the local coordinate in the light guide member. In the projection see-through device 70, the light guide member 10 includes the first surface S11 having weak negative refractive power, the second surface S12 having comparatively strong positive refractive power, the third surface S13 having comparatively weak positive refractive power, the fourth surface S14 having comparatively weak negative refractive power, the fifth surface S15 having comparatively weak positive refractive power, and the sixth surface S16 having comparatively strong positive refractive power. The projection lens 30 includes the first lens 31 having negative refractive power, and the second lens 31 having positive refractive power. A specific specification of the optical system of Example 5 is as follows. A horizontal viewing angle is 20.1 degrees, a vertical viewing angle is 11.4 degrees, the size of a display area of the video display element is 9.22*5.18 mm, a pupil diameter is 5 mm, and a focal distance is about 26 mm.

Figure 22:
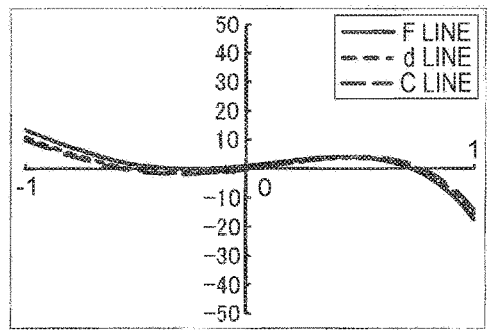
Figure 22:
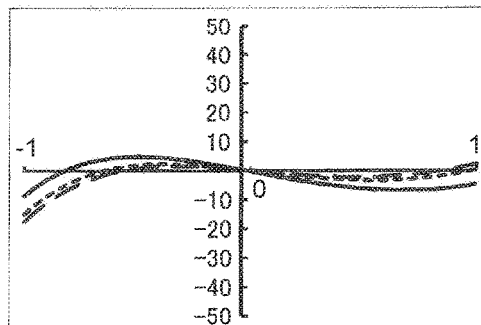
Figure 22:
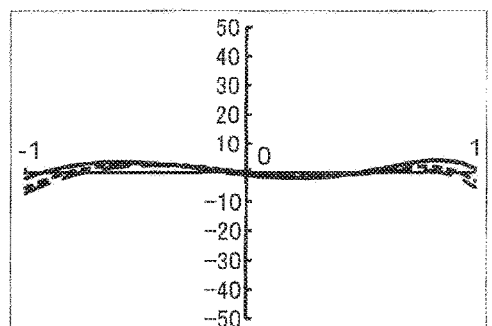
Figure 22:
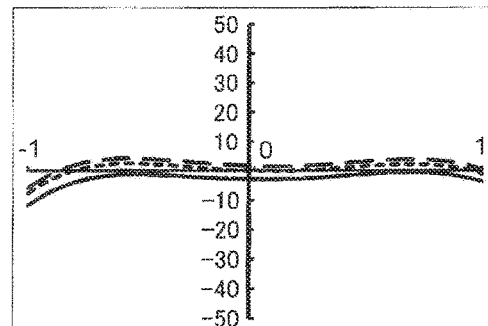
Figure 22:
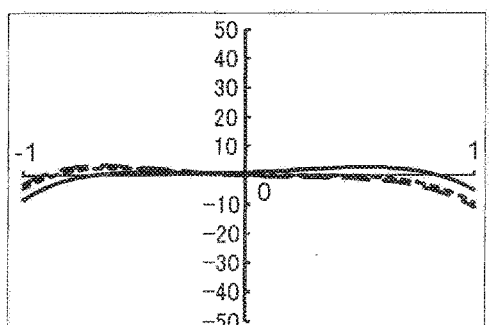
Figure 22:
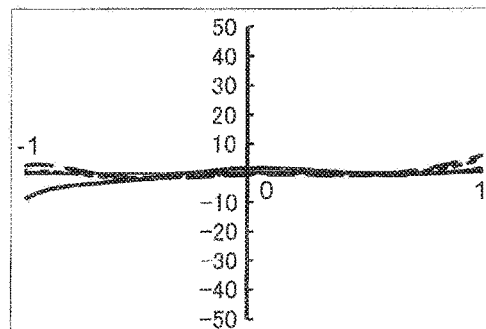
Figure 23:
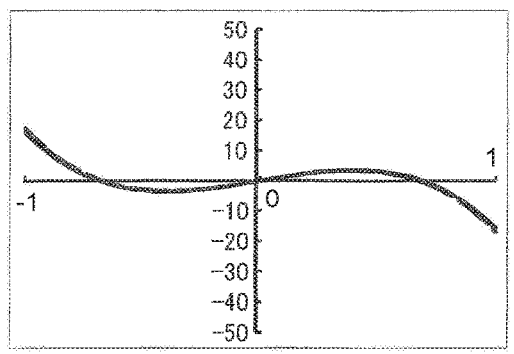
Figure 23:
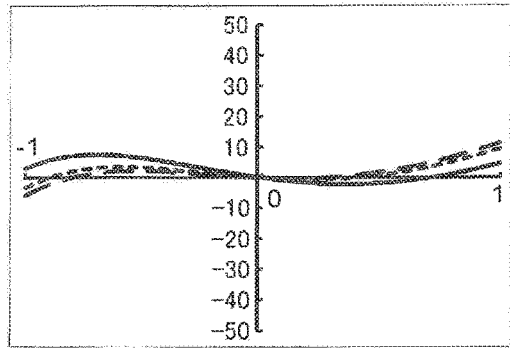
Figure 23:
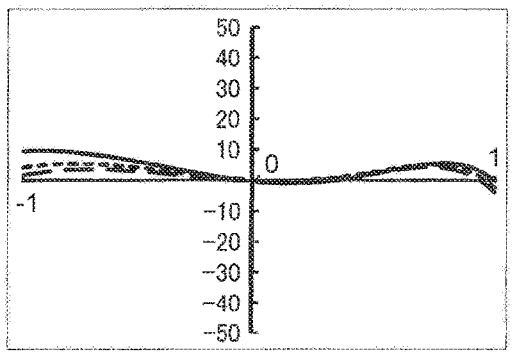
Figure 23:
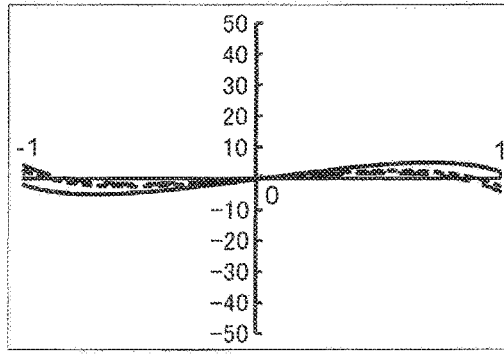
Figure 23:
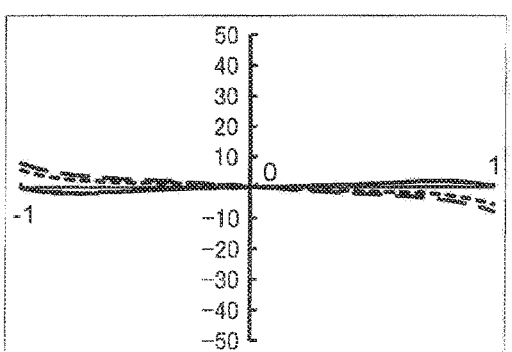
Figure 23:
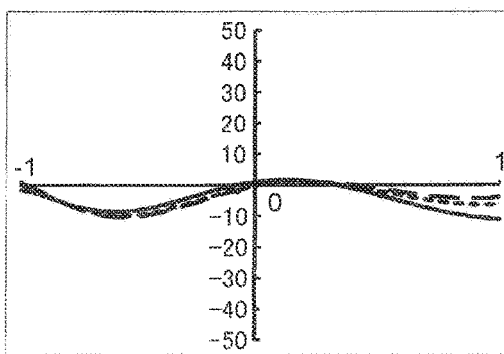

FIGS. 22 and 23 show aberration of Example 5. In each aberration diagram, the horizontal axis represents a position in a pupil, and the vertical axis represents the amount of aberration in units of micron. Specifically, (A) and (B) in FIG. 22 show aberration in the Y and X directions at an azimuth of 10 degrees in the X direction and 5.7 degrees in the Y direction, (C) and (D) in FIG. 22 show aberration in the Y and X directions at an azimuth of 0.0 degree in the X direction and 5.7 degrees in the Y direction, and (E) and (F)

in FIG. 22 show aberration in the Y and X directions at an azimuth of −10 degrees in the X direction and 5.7 degrees in the Y direction. (A) and (B) in FIG. 23 show aberration in the Y and X directions at an azimuth of 10 degrees in the X direction and 0.0 degree in the Y direction, (C) and (D) in FIG. 23 show aberration in the Y and X directions at an azimuth of 0.0 degree in the X direction and 0.0 degree in the Y direction, and (E) and (F) in FIG. 23 show aberration in the Y and X directions at an azimuth of −10 degrees in the X direction and 0.0 degree in the Y direction. The amount of aberration shown in the drawing represents the amount of aberration on the image surface of the video display element when a light beam is reversed for convenience.

In regards to Examples 1 to 5, numerical data relating to the conditional expressions (1) to (3) is summarized in Table 21.

TABLE 21

| | Coefficient value or Conditional value | Example 1 | Example 2 | Example 3 | Example 4 | Example 5 |
|---|---|---|---|---|---|---|
| | $A1_{2,0}$ | 0.000E+00 | −2.087E−02 | −2.432E−03 | −5.276E−03 | −9.590E−03 |
| | $A1_{0,2}$ | 0.000E+00 | −2.253E−02 | −1.191E−02 | −3.830E−02 | −3.895E−02 |
| | $A3_{2,0}$ | 0.000E+00 | −1.889E−02 | −2.396E−03 | −4.960E−03 | −9.015E−03 |
| | $A3_{0,2}$ | 0.000E+00 | −1.983E−02 | −1.107E−02 | −3.102E−02 | −3.174E−02 |
| Conditional Expression (1) | $A1_{2,0} + A1_{0,2}$ | 0.0E+00 | −4.3E−02 | −1.4E−02 | −4.4E−02 | −4.9E−02 |
| Conditional Expression (1) | $A3_{2,0} + A3_{0,2}$ | 0.0E+00 | −3.9E−02 | −1.3E−02 | −3.6E−02 | −4.1E−02 |
| Conditional Expression (2) | $|A1_{2,0} - A1_{0,2}|$ | 0.0E−00 | 1.7E−03 | 9.5E−03 | 3.3E−02 | 2.9E−02 |
| Conditional Expression (2) | $|A3_{2,0} - A3_{0,2}|$ | 0.0E−00 | 9.4E−04 | 8.7E−03 | 2.6E−02 | 2.3E−02 |
| Conditional Expression (3) | $|A1_{2,0} - A3_{2,0}|$ | 0.0E−00 | 2.0E−03 | 3.6E−05 | 3.2E−04 | 5.8E−04 |
| Conditional Expression (3) | $|A1_{0,2} - A3_{0,2}|$ | 0.0E−00 | 2.7E−03 | 8.3E−04 | 7.3E−03 | 7.2E−03 |

In regards to Examples 1 to 5, numerical data relating to the interval between the first surface S11 and the third surface S13 and the angle between the visual axis (emission-side optical axis AXO) and the z axis of the second surface S12 is summarized in Table 22.

TABLE 22

| | Example 1 | Example 2 | Example 3 | Example 4 | Example 5 |
|---|---|---|---|---|---|
| Gap between S11 and S13 (mm) | 10.46 | 8.00 | 9.00 | 8.50 | 8.50 |
| Angle between visual axis and z-axis of S12 (°) | 23.8 | 23 | 25 | 24 | 24 |

The conditional expression (3) affects diopter of the light guide member with respect to external light, and if the thickness of the light guide member is T and the refractive index is N, diopter Dx in the x-axis direction and diopter Dy in the y-axis direction on the optical axis of the light guide member are given by the following expressions.

[Math. 13]

$$Dx = 2000(N-1)(A1_{2,0} - A3_{2,0} + (2T(N-1)/N)*A1_{2,0}*A3_{2,0})$$

$$Dy = 2000(N-1)(A1_{0,2} - A3_{0,2} + (2T(N-1)/N)*A1_{0,2}*A3_{0,2})$$

In regards to Examples 1 to 5, numerical data relating to diopter is summarized in Table 23 based on the above-described expressions.

TABLE 23

| | Example 1 | Example 2 | Example 3 | Example 4 | Example 5 |
|---|---|---|---|---|---|
| Diopter Dx (D: Diopter) | 0.00 | 0.20 | 0.00 | −0.17 | −0.07 |
| Diopter Dy (D: Diopter) | 0.00 | −0.26 | −0.02 | −0.34 | 0.03 |

TABLE 23-continued

| | Example 1 | Example 2 | Example 3 | Example 4 | Example 5 |
|---|---|---|---|---|---|
| Thickness T of prism (mm) | 10.46 | 8.0 | 9.0 | 8.5 | 8.5 |
| Refractive index N | 1.525 | 1.525 | 1.525 | 1.525 | 1.525 |

The coefficients $A_{2,0}$ and $A_{0,2}$ relating to the non-axisymmetric aspheric surface are opposite signs, and the coefficients $A_{2,0}$ and $A_{0,2}$ which satisfy the following conditional expression (4) are values which represent an index for correcting aberration, such as astigmatism, generated on the reflection surface of the light guide member by the non-axisymmetric aspheric surface of the projection lens, thereby obtaining excellent image quality.

[Math. 14]

$$10^{-2} < |A_{2,0} - A_{0,2}| \qquad (4)$$

The above-described requirement of Examples 1 to 5 is summarized in Table 24. In all examples, the above-described requirement is satisfied.

TABLE 24

|  | Example 1 | Example 2 | Example 3 | Example 4 | Example 5 |
|---|---|---|---|---|---|
| $A_{2,0}$ | 4.99E−02 | 1.13E−01 | 9.36E−03 | −1.42E−02 | −4.70E−02 |
| $A_{0,2}$ | −6.96E−02 | −6.69E−03 | −3.92E−02 | 1.01E−01 | 8.93E−02 |
| $|A_{2,0} - A_{0,2}|$ | 1.20E−01 | 1.20E−01 | 4.86E−02 | 1.15E−01 | 1.36E−01 |

The angle between the incidence-side optical axis AXI (projection lens optical axis) and the emission-side optical axis AXO (visual axis) of the projection lens 30 in each of Examples 1 to 5 is summarized in Table 25. In all examples, the angle is greater than 0 degree and equal to or less than 30 degrees.

TABLE 25

|  | Example 1 | Example 2 | Example 3 | Example 4 | Example 5 |
|---|---|---|---|---|---|
| Angle between lens optical axis and visual axis | 2.67 | 0.92 | 6.31 | 11.30 | 9.87 |

Others

Although the invention has been described on the basis of the foregoing embodiment, the invention is not limited to the foregoing embodiment, and may be realized in various forms without departing from the spirit of the invention. For example, the following modifications may be made.

In the above-description, although the projection lens has one non-axisymmetric aspheric surface, the projection lens may have two or more non-axisymmetric aspheric surfaces.

In the above description, although the half mirror layer (transflective film) 15 is formed in a horizontal rectangular area, the contour of the half mirror layer 15 may be appropriately changed according to usages and other specifications. The transmittance or reflectance of the half mirror layer 15 may be changed according to usages and others.

In the above description, although the distribution of display luminance in the video display element 82 is not particularly adjusted, when a luminance difference occurs depending on position, or the like, the distribution of display luminance may be adjusted unevenly or the like.

In the above description, although the video display element 82 which includes a transmissive liquid crystal display device or the like is used as the image display device 80, the image display device 80 is not limited to the video display element 82 which includes a transmissive liquid crystal device or the like, and various devices may be used. For example, a configuration using a reflective liquid crystal display device may be made, or a digital micro-mirror device or the like may be used, instead of the video display element 82 which includes the liquid crystal display device or the like. A self-luminous element represented by an LED array or an OLED (organic EL) may be used as the image display device 80.

In the foregoing embodiment, although the image display device 80 which includes a transmissive liquid crystal display device or the like is used, alternatively, a scanning image display device may be used.

Specifically, as shown in FIG. 24, a first display device 100A which is a virtual image display apparatus includes a light guide device 20 and an image display device 380. The light guide device 20 corresponds to a portion where the light guide member 10 and the light transmission member 50 are bonded, thus, description thereof will be omitted. The image display device 380 is a device which forms signal light subjected to intensity modulation and emits signal light as scanning light TL, and has a signal light forming unit 381 and a scanning optical system 382.

The signal light forming unit 381 includes a light source, and emits signal light LL which is modulated and formed based on a control signal from a control circuit (not shown). The scanning optical system 382 scans and emits signal light LL passing through the signal light forming unit 381. Here, the scanning optical system 382 includes a MEMS mirror or the like, and performs two-dimensional scanning longitudinally and transversely changing the emission angle of a light beam (scanning light TL) by changing a posture in synchronization with modulation of signal light LL by the signal light forming unit 381 to adjust the optical path of signal light LL. With the above, the image display device 380 makes scanning light TL to be video light GL enter the light guide device 20, and makes scanning light TL scan the entire partial area of the second surface S12 in which the half mirror layer 15 is formed.

An operation of the first display device 100A shown in the drawing will be described. The image display device 380 emits signal light LL toward the fourth surface S14 as the light incidence surface of the light guide device 20 through the projection lens 30 having the lens 31 including the non-axisymmetric aspheric lens surface 31a and other lenses 32 and 33 as scanning light TL as described above. The light guide device 20 guides scanning light TL passing through the fourth surface S14 due to total reflection or the like therein and makes scanning light TL reach the half mirror layer 15. At this time, scanning light TL is scanned on the surface of the half mirror layer 15, whereby a virtual image is formed by video light GL as a trace of scanning light TL. A person who mounts the apparatus captures the virtual image by the eye EY to visually recognize an image.

In the foregoing embodiment, although the light guide member 10 and the light transmission member 50 which is the auxiliary optical block are configured to cover the entire front of the eye EY of the observer, the invention is not limited thereto, and for example, as shown in FIGS. 25A and 25B, a small configuration may be made in which a portion including the second surface S12, which is a curved surface shape having the half mirror layer 15, covers only a part of the eye EY, that is, covers a part of the front of the eye, and an uncovered portion is provided. In this case, even with a configuration in which the light guide member 10 and the light transmission member 50 are sufficiently small and a mirror for total reflection is arranged instead of the half mirror layer 15 without using the see-through manner, a person who mounts the apparatus can observe an external scene in the vicinity of the light guide member 10 and the light transmission member 50. In the case shown in the drawing, although the half mirror layer is formed on the entire second surface S12 or the substantially entire second surface S12, the half mirror layer 15 may be formed only on a part of the second surface S12. In the example of FIG. 25B, although the half mirror layer 15 is arranged substantially in front of the eye EY, the half mirror layer 15 may be arranged to be shifted from the front, and the observer may move the eyes to visually recognize an image. For example, the position of the eye EY may be slightly lowered (the position of the light guide member 10 and the light transmission member 50 is slightly raised). In this case, the lower half of the eye EY is in a state of being viewed from the bottom of the light guide member 10 and the light transmission member 50.

In the above description, although the virtual image display apparatus 100 including a pair of display devices 100A and 100B has been described, a single display device may be provided. That is, a configuration may be made in which the projection see-through device 70 and the image display device 80 are provided only for either the right eye or the left eye to view an image with a single eye, instead of providing the set of the projection see-through device 70 and the image display device 80 for each of both the right eye and the left eye.

In the above description, although the interval between a pair of display devices 100A and 100B in the X direction has not been described, the interval between both display devices 100A and 100B is not limited to a fixed interval, and the interval may be adjusted by a mechanical mechanism or the like. That is, the interval between both display devices 100A and 100B in the X direction may be adjusted according to the eye width of the observer or the like.

In the foregoing description, although the half mirror layer 15 is a simple semitransmissive film (for example, a metal reflection film or a dielectric multilayer film), the half mirror layer 15 may be replaced with a flat or curved hologram element.

In the above description, although video light is totally reflected by an interface with air and guided without providing a mirror, a half mirror, or the like on the first surface S11 and the third surface S13 of the light guide member 10, it is assumed that total reflection in the virtual image display apparatus 100 according to the invention includes reflection by a mirror coating or a half mirror film which is formed on the entire or apart of the first surface S11 or the third surface S13. For example, total reflection may include a case where, after the incidence angle of image light satisfies the total reflection condition, the mirror coating or the like is formed on the entire or a part of the first surface S11 or the third surface S13 to reflect substantially entire image light. Furthermore, the entire or a part of the first surface S11 or the third surface S13 may be coated with a mirror having a slight transmission property insofar as sufficiently bright image light can be obtained.

In the above description, although the light guide member 10 or the like extends in the horizontal direction in which the eyes EY are arranged, the light guide member 10 may be arranged to extend in the vertical direction. In this case, the light guide member 10 has a structure of being arranged in parallel, not in series. The configurations relating to the vertical direction and the horizontal direction may be appropriately replaced according to the direction in which video light (image light) is guided compared to the casein the above description.

REFERENCE SIGNS LIST

AX1 to AX5: optical axis
AXI: incidence-side optical axis
AXO: emission-side optical axis
EY: eye
GL: video light
HL: external light
II: image surface of intermediate image
PA: partial area
S11 to S16: first to sixth surfaces
S51 to S53: transmission surface
SL: illumination light
SR: reference surface
10: light guide member
10s: main body
11, 12: light guide portion
15: half mirror layer
20: light guide device
30: projection lens
31, 32, 33: lens
31a, 31b, 32b: lens surface (non-axisymmetric aspheric surface)
32a, 33a, 33b: lens surface
50: light transmission member
70: projection see-through device
80: image display device
81: illumination device
82: video display element (video element)
OI: image surface
84: drive control unit
100: virtual image display apparatus
100A, 100B: display device
101a, 101b: optical member
102: frame part
104: temple part
105a, 105b: image forming body part
105d: exterior member
107: frame
107a: front portion
107b, 107c: side portion
108: protector
15: half mirror layer
CC: adhesive layer

The invention claimed is:
1. A virtual image display apparatus comprising:
a video element which generates a video light;
a light guide member which includes two or more non-axisymmetric curved surfaces and is a part of an optical system, an intermediate image being formed inside the light guide member; and
a projection lens which emits the video light from the video element to the light guide member,
wherein the projection lens includes at least one non-axisymmetric aspheric surface,
the light guide member includes a first surface and a third surface that are flat surfaces substantially in parallel with each other and arranged to face each other,
the video light is totally reflected by the third surface, is totally reflected by the first surface, is reflected by a second surface, is transmitted through the first surface, and reaches an observation side,
the light guide member includes a fourth surface which is arranged on a light incidence side from the third surface and reflects the video light toward the third surface, and a fifth surface which reflects the video light toward the fourth surface,
the second surface, the fourth surface, and the fifth surface are non-axisymmetric curved surfaces.
2. The virtual image display apparatus according to claim 1,
wherein in the light guide member, the intermediate image is on the optical path of video light from the third surface to the fifth surface.

3. The virtual image display apparatus according to claim 1, wherein the projection lens optical axis in the projection lens and a visual axis to be assumed as the direction of the eyes of the observer make an angle equal to or greater than 0 degree and equal to or less than 30 degrees.

4. The virtual image display apparatus according to claims 1,
wherein, when an expression of a surface shape is expanded as a polynomial in terms of orthogonal coordinates x and y extending in a tangential direction from the origin with the origin of each surface constituting the optical system as a reference, and the coefficient of a term $x^m*y^n$ of the polynomial expression representing a k-th surface is $Ak_{m,n}$, wherein k, m and n are each an integer equal to or greater than 0, the following conditions are satisfied:

$-10^{-1} < A1_{0,2} + A1_{2,0} < 10^{-2}$ and $-10^{-1} < A3_{0,2} + A3_{2,0} < 10^{-2}$ $|A1_{2,0} - A1_{0,2}| < 10^{-1}$ and $|A3_{2,0} - A3_{0,2}| < 10^{-1}$ $|A1_{2,0} - A3_{2,0}| < 10^{-2}$ and $|A1_{0,2} - A3_{0,2}| < 10^{-2}$.

5. The virtual image display apparatus according to claim 1,
wherein, when an expression of a surface shape is expanded as polynomial in terms of orthogonal coordinates x and y extending in a tangential direction from the origin with the origin of the non-axisymmetric aspheric surface of the projection lens as a reference, and when a coefficient of a term $x^m*y^n$ of the polynomial expression representing the non-axisymmetric aspheric surface is $A_{m,n}$, where m and n are each an integer equal to or greater than 0, $A_{2,0}$ and $A_{0,2}$ are opposite signs and satisfy the following condition:

$10^{-2} < |A_{2,0} - A_{0,2}|$.

6. The virtual image display apparatus according to claim 1,
wherein, inside the light guide member, video light from the video element is reflected five times including at least two times of total reflection.

7. The virtual image display apparatus according to claim 1, wherein a half mirror is formed on the second surface, video light is provided to an observer, a light transmission member is arranged integrally outside of the second surface, diopter to external light is substantially set to 0, and external light and video light are provided to the observer in an overlapping manner.

8. The virtual image display apparatus according to claim 1, wherein the projection lens includes two or more axisymmetric aspheric surfaces as surfaces other than the non-axisymmetric aspheric surface.

9. The virtual image display apparatus according to claim 1, wherein the optical system including the light guide member covers a part in front of the eyes of the observer, and a portion where the front of the eyes is not covered is provided.

10. The virtual image display apparatus according to claim 1, wherein the video element has a signal light forming unit which emits signal light modulated corresponding to an image, and a scanning optical system which scans signal light entering from the signal light forming unit to emit signal light as scanning light.

11. A projection see-through device comprising:
a light guide member which includes two or more non-axisymmetric curved surfaces and is a part of an optical system, an intermediate image being formed inside the light guide member; and
a projection lens which emits a video light from a video element to the light guide member,
wherein the projection lens includes at least one non-axisymmetric aspheric surface,
the light guide member includes a first surface and a third surface that are flat surfaces substantially in parallel with each other and arranged to face each other,
the video light is totally reflected by the third surface, is totally reflected by the first surface, is reflected by a second surface, is transmitted through the first surface, and reaches an observation side,
the light guide member includes a fourth surface which is arranged on a light incidence side from the third surface and reflects the video light toward the third surface, and a fifth surface which reflects the video light toward the fourth surface,
the second surface, the fourth surface, and the fifth surface are non-axisymmetric curved surfaces.

* * * * *